(12) United States Patent
Baxter et al.

(10) Patent No.: US 10,112,258 B2
(45) Date of Patent: Oct. 30, 2018

(54) COAXIAL DISTANCE MEASUREMENT VIA FOLDING OF TRIANGULATION SENSOR OPTICS PATH

(75) Inventors: Bruce Baxter, San Mateo, CA (US); Dennis Mullins, Sunnyvale, CA (US)

(73) Assignee: View, Inc., Milpitas, CA (US)

( * ) Notice: Subject to any disclaimer, the term of this patent is extended or adjusted under 35 U.S.C. 154(b) by 505 days.

(21) Appl. No.: 13/436,387

(22) Filed: Mar. 30, 2012

(65) Prior Publication Data
US 2013/0256285 A1    Oct. 3, 2013

(51) Int. Cl.
*B23K 26/16* (2006.01)
*B23K 26/04* (2014.01)
*G01S 17/48* (2006.01)
*G01S 7/481* (2006.01)
*B23K 26/364* (2014.01)

(52) U.S. Cl.
CPC .......... *B23K 26/048* (2013.01); *B23K 26/364* (2015.10); *G01S 7/481* (2013.01); *G01S 17/48* (2013.01)

(58) Field of Classification Search
CPC .................. B23K 26/1476; B23K 26/0656
USPC ............ 219/121.67, 121.68, 121.83, 121.72; 356/623, 631, 602, 3.13, 3.01, 3.1
See application file for complete search history.

(56) References Cited

U.S. PATENT DOCUMENTS

| | | | |
|---|---|---|---|
| 4,356,392 A * | 10/1982 | Wittekoek et al. | ........ 250/201.4 |
| 4,363,962 A * | 12/1982 | Shida | .................... G03F 9/7026 250/201.4 |
| 4,650,983 A * | 3/1987 | Suwa | ............................. 250/204 |
| 4,774,403 A * | 9/1988 | Arts | ............................. 250/205 |
| 4,818,841 A * | 4/1989 | Sliva et al. | ............. 219/121.83 |
| 4,866,262 A * | 9/1989 | van der Werf et al. | ... 250/201.4 |

(Continued)

FOREIGN PATENT DOCUMENTS

CN    102248304 A    11/2011
CN    102308372 A    1/2012
(Continued)

OTHER PUBLICATIONS

International Search Report and Written Opinion dated Jul. 8, 2013 in PCT/US2013/033827.

(Continued)

*Primary Examiner* — Jimmy Chou
(74) *Attorney, Agent, or Firm* — Weaver Austin Villaneuve & Sampson LLP; Brian D. Griedel

(57) ABSTRACT

This disclosure provides apparatus and methods for scribing a substrate. In one aspect, an apparatus includes optics for focusing a scribe beam onto a substrate and a beam focus adjustment mechanism for adjusting the optics. A triangulation-based distance sensor determines a distance between the triangulation-based distance sensor and the substrate, with the triangulation-based distance sensor being positioned at a location offset from the scribe beam. Reflecting elements are positioned to reflect an incident beam from the triangulation-based distance sensor's source to the substrate and then back to the triangulation-based distance sensor's detector. The beam focus adjustment mechanism adjusts the optics based on the distance between the triangulation-based distance sensor and the substrate so that the scribe beam is focused at a desired position on the substrate.

20 Claims, 15 Drawing Sheets

(56) References Cited

U.S. PATENT DOCUMENTS

| | | | | |
|---|---|---|---|---|
| 5,028,799 | A * | 7/1991 | Chen et al. | 250/559.23 |
| 5,045,669 | A * | 9/1991 | Ortiz et al. | 219/121.83 |
| 5,151,608 | A * | 9/1992 | Torii et al. | 250/559.38 |
| 5,191,200 | A * | 3/1993 | van der Werf et al. | 250/201.4 |
| 5,194,791 | A * | 3/1993 | Cull | 318/568.1 |
| 5,486,677 | A * | 1/1996 | Maischner et al. | 219/121.83 |
| 5,502,311 | A * | 3/1996 | Lmai et al. | 250/548 |
| 5,661,667 | A * | 8/1997 | Rueb et al. | 702/95 |
| 5,768,443 | A * | 6/1998 | Michael et al. | 382/294 |
| 5,973,770 | A * | 10/1999 | Carter et al. | 356/4.09 |
| 6,008,906 | A * | 12/1999 | Maris | 356/432 |
| 6,118,540 | A * | 9/2000 | Roy et al. | 356/394 |
| 6,124,601 | A * | 9/2000 | Yoshii et al. | 250/559.29 |
| 6,721,036 | B2 * | 4/2004 | Scheiberlich et al. | 355/53 |
| 7,199,882 | B2 * | 4/2007 | Svetkoff et al. | 356/602 |
| 7,223,937 | B2 * | 5/2007 | Nagai | B23K 26/0057 219/121.67 |
| 7,231,081 | B2 * | 6/2007 | Snow et al. | 382/151 |
| 7,288,738 | B2 * | 10/2007 | Patel | 219/121.68 |
| 7,359,068 | B2 * | 4/2008 | Yonescu | 356/614 |
| 7,616,327 | B2 * | 11/2009 | Michelin | 356/623 |
| 7,911,674 | B2 * | 3/2011 | Gaskell | G02F 1/153 359/265 |
| 8,669,507 | B2 * | 3/2014 | Lin et al. | 250/201.1 |
| 2003/0192866 | A1 * | 10/2003 | Han | 219/121.69 |
| 2005/0057757 | A1 * | 3/2005 | Colonna De Lega | G01B 11/0675 356/497 |
| 2007/0084837 | A1 * | 4/2007 | Kosmowski | 219/121.68 |
| 2008/0158572 | A1 * | 7/2008 | Hughes | G01B 11/0625 356/631 |
| 2010/0027574 | A1 * | 2/2010 | Fujita et al. | 372/38.02 |
| 2010/0243427 | A1 * | 9/2010 | Kozlowski et al. | 204/192.1 |
| 2010/0245973 | A1 * | 9/2010 | Wang et al. | 359/275 |
| 2010/0320179 | A1 * | 12/2010 | Morita et al. | 219/121.69 |
| 2011/0100967 | A1 * | 5/2011 | Yoo et al. | 219/121.73 |
| 2011/0129958 | A1 * | 6/2011 | Rekow | B23K 26/03 438/95 |
| 2012/0026573 | A1 * | 2/2012 | Collins et al. | 359/275 |
| 2012/0268939 | A1 * | 10/2012 | Finarov | B23K 26/046 362/259 |

FOREIGN PATENT DOCUMENTS

| | | | |
|---|---|---|---|
| DE | 42 07 169 A1 | 9/1993 | |
| DE | 4207169 A1 * | 9/1993 | B23K 26/04 |
| DE | 10 2007 027377 A1 | 1/2008 | |
| WO | WO 2013/148643 A1 | 10/2013 | |

OTHER PUBLICATIONS

Metrology Sensors GmbH (MSG), "LaserTec Series, LAF1-TTL, High Speed Dynamic Autofocus Sensor, Specification," downloaded Mar. 30, 2012. (http://www.metsens.com/)

International Preliminary Report on Patentability dated Oct. 9, 2014 issued in PCT/US2013/033827.

CN Office Action dated May 5, 2016 in CN Application No. 201380025671.7.

CN Notice of Allowance with Search Report dated Mar. 29, 2017 in CN Application No. 201380025671.7.

Extended European Search Report dated Oct. 8, 2015 issued in PCT/US2013033827.

European Office Action dated Jan. 25, 2018 for EP Application No. 13767962.71206.

* cited by examiner

Top-Down View

COAXIAL DISTANCE MEASUREMENT VIA FOLDING OF TRIANGULATION SENSOR OPTICS PATH

FIELD

The disclosed embodiments relate generally to apparatus and methods for tracking the position of a substrate surface, more particularly to apparatus and methods using an optical detection system to track the position of a substrate surface and facilitate adjustment of the focal point of the scribe beam.

BACKGROUND

There are many applications where precise control of the position of a beam's focal point with respect to a surface is required. For example, optical inspection, machine vision, laser patterning, and a variety of other similar applications require dynamic control of a focal length by closing a position control loop on a measured distance to a substrate surface (or surfaces). In some instances, the form factor of the substrate dictates that the measurement of a distance between a lens and a surface of a substrate be performed from the same side of the substrate as the patterning laser, inspection optics, etc. Further, in some instances, the substrate surface may be uneven over short distances which may result in error in the distance measurement as the measurement position deviates from the position of interest. For this reason, the measurement of a distance to a surface may be performed at a point close to a position to be patterned or inspected.

SUMMARY

Disclosed are embodiments of an apparatus including a triangulation-based distance sensor and associated optical elements and methods of use of the apparatus.

One innovative aspect of the subject matter described in this disclosure can be implemented in an apparatus configured for scribing an electrochromic lite having a first side and a second side with an electrochromic device disposed on the first side. The apparatus includes a scribe laser and a triangulation-based distance sensor. A scribe beam from the scribe laser is configured to impinge upon the electrochromic lite from the second side and to define a scribe optical path such that the scribe beam is substantially perpendicular to the second side of the electrochromic lite. The scribe beam is configured to ablate the electrochromic device. The triangulation-based distance sensor includes a triangulation laser and a detector. The triangulation-based distance sensor is oriented such that a first laser beam from the triangulation laser is substantially perpendicular to the scribe optical path, is reflected from the electrochromic lite, and then detected by the detector.

In some embodiments, the triangulation-based distance sensor is positioned on the same side of the electrochromic lite as the scribe optical path. In some embodiments, the first laser beam is reflected along a path substantially perpendicular to the scribe optical path prior to being detected by the detector.

In some embodiments, the triangulation-based distance sensor further includes a first mirror oriented to reflect the first laser beam from the triangulation laser that is substantially perpendicular to the scribe optical path to substantially accommodate the scribe optical path. The first laser beam is reflected such that it intersects the scribe beam at a nominal focal plane. The triangulation-based distance sensor further includes a second mirror oriented to reflect the first laser beam reflected from the electrochromic lite to the detector.

In some embodiments, the apparatus further includes a focus lens. The focus lens is positioned such that the scribe beam impinges substantially at an interface of the electrochromic lite and the electrochromic device. The triangulation-based distance sensor is configured to determine a position of the interface of the electrochromic lite and the electrochromic device. The processor is configured to position the focus lens based on the determination of the triangulation-based distance sensor.

Another innovative aspect of the subject matter described in this disclosure can be implemented in an apparatus for scribing a nominally flat substrate. The apparatus includes an optics set, a beam focus adjustment mechanism, a triangulation-based distance sensor, and at least one reflecting element. The optics set is for focusing a scribe beam onto the substrate at a scribe position to create a scribe line on the substrate when the substrate and scribe beam are moved with respect to each other. The beam focus adjustment mechanism is for adjusting the optics set to cause a focal point of the scribe beam to follow contours on the substrate as the substrate moves with respect to the scribe beam during scribing. The triangulation-based distance sensor includes (i) a detection beam source for issuing an incident beam for reflecting off the substrate and (ii) a detector for detecting the position of a reflected beam created when the incident beam reflects off the substrate. The position of the reflected beam on the detector provides an indication or measure of a distance between the triangulation-based distance sensor and the substrate. The triangulation-based distance sensor is configured such that the incident beam emanates from the detection beam source substantially orthogonal to the scribe beam. The at least one reflecting element is positioned to (i) reflect the incident beam from the triangulation-based distance sensor onto the substrate at a location on or proximate to the scribe position, and (ii) reflect the reflected beam from the substrate onto the detector. The triangulation-based distance sensor provides the indication or measure of a distance between the triangulation-based distance sensor and the substrate.

In some embodiments, the apparatus further includes logic for receiving the indication or measure of a distance between the triangulation-based distance sensor and the substrate and for directing the beam focus adjustment mechanism to adjust the optics set to maintain the scribe beam focal point on a region of the substrate.

In some embodiments, the apparatus further includes a first translation stage for moving the substrate in a first direction with respect to the optics set during scribing. In some embodiments, the apparatus further includes a second translation stage for moving the substrate with respect to the optics set in a direction substantially orthogonal to both (i) the direction of propagation of the scribe beam and (ii) the first direction.

Another innovative aspect of the subject matter described in this disclosure can be implemented in a method for scribing an electrochromic lite having a first side and a second side with an electrochromic device disposed on the first side. The method includes determining a position of an interface of the first side of the electrochromic lite and the electrochromic device using a triangulation-based distance sensor. The triangulation-based distance sensor is oriented such that a first laser beam from a triangulation laser is substantially parallel to the first side of the electrochromic lite, is reflected from the electrochromic lite, and is detected by a detector. A focus lens is adjusted such that a scribe beam emitted from a scribe laser impinges the second side of the electrochromic lite and is focused at the interface of the first side of the electrochromic lite and the electrochromic device. An appropriate focal distance is determined by the position of the interface provided by the triangulation-based distance sensor. The electrochromic device is ablated from a region of the first side of the electrochromic lite with the scribe beam.

In some embodiments, the scribe beam defines a scribe optical path, wherein the triangulation-based distance sensor further includes a first mirror oriented to reflect the first laser beam, that is substantially parallel to the first side of the electrochromic lite, to substantially accommodate the scribe optical path, wherein the first laser beam is reflected such that the first laser beam intersects the scribe beam at a nominal focal plane, and wherein the triangulation-based distance sensor further includes a second mirror oriented to reflect the first laser beam reflected from the electrochromic lite to the detector.

In some embodiments, the operations of the method are repeated during relative movement between the electrochromic lite and the triangulation-based distance sensor. In some embodiments, the relative movement between the electrochromic lite and the triangulation-based distance sensor includes movement of the electrochromic lite while the triangulation-based distance sensor remains stationary.

Another innovative aspect of the subject matter described in this disclosure can be implemented in an assembly including a triangulation laser, a detector, a first mirror, and a second mirror. The first mirror is configured to reflect a first laser beam from the triangulation laser about 90 degrees and onto a surface of a substrate, and to tilt the first laser beam at an angle relative to a line normal to the substrate. The second mirror is configured to reflect the first laser beam, after it is reflected from the surface of the substrate, about 90 degrees and to the detector. The assembly is configured to accommodate a scribe beam from a scribe laser such that the first laser beam strikes the substrate substantially at a focal point of the scribe beam.

In some embodiments, the assembly further includes a port for allowing a focal cone of the scribe beam to pass therethrough prior to impinging on the substrate at the focal point. In some embodiments, the first and second mirrors are positioned on either side of the port. During operation, the first laser beam straddles the focal cone except for a region proximate the focal point. In some embodiments, the triangulation laser and the detector are housed in a single enclosure.

These and other features and advantages will be described in further detail below, with reference to the associated drawings.

DETAILED DESCRIPTION

Figure 1:
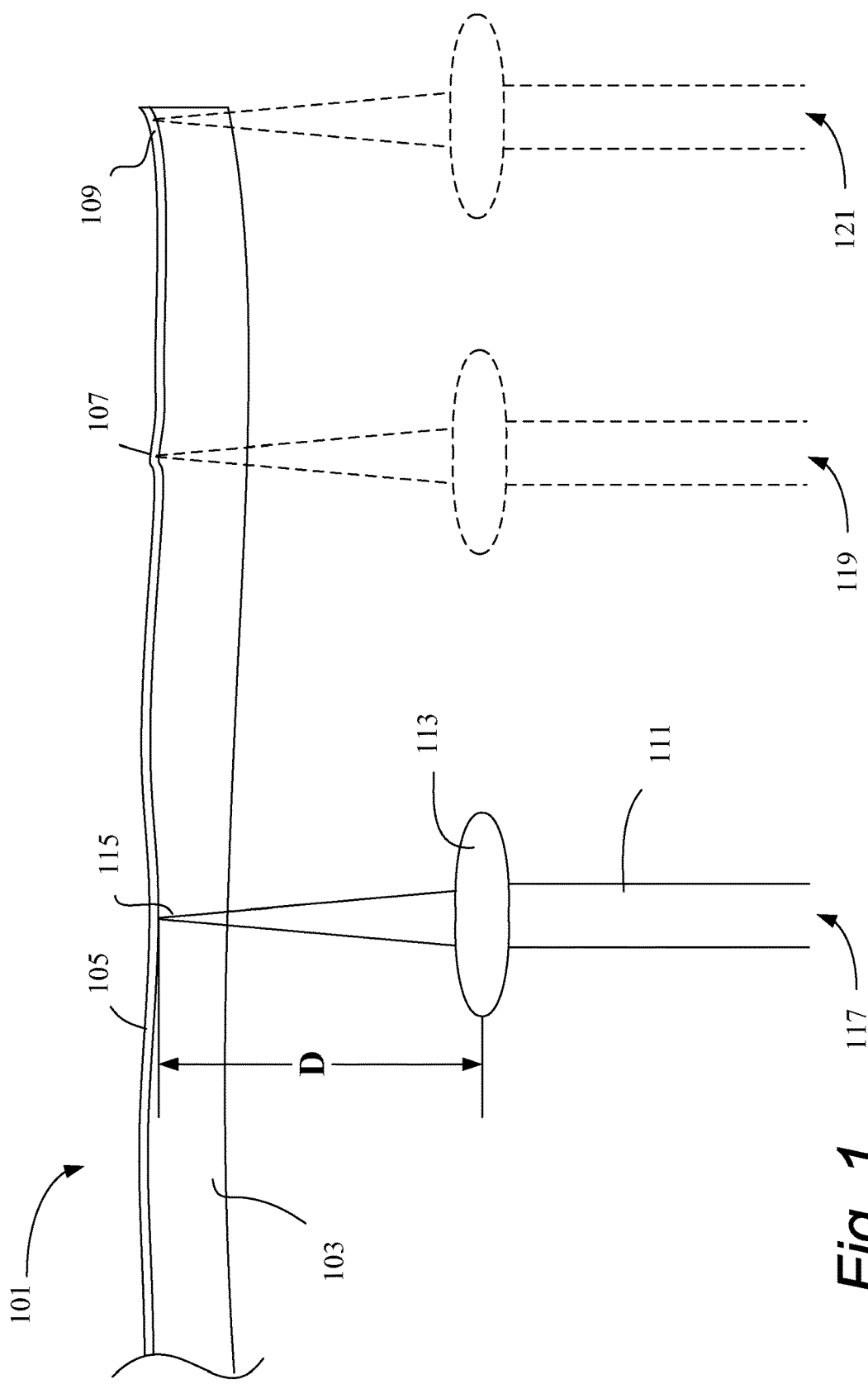
FIG. 1 schematically illustrates a scribing process on a coated substrate.

It should be understood that while the disclosed embodiments focus on apparatus and methods for scribing electrochromic (EC) windows (also referred to as smart windows), the concepts disclosed herein may apply to other types of substrates. For example, the concepts disclosed herein may apply to focus control technologies on any type of nominally flat substrate. Other types of substrates that may be scribed include mirrors, vision glasses, optical tools, and other elements that transmit, reflect, and/or scatter light. Also, embodiments are described herein in terms of laser scribing; this is not intended to be limiting, but rather for illustrative purposes. Coatings that may be scribed on such substrates include active and passive coatings. Examples of passive coatings include layers of metal, dielectric, and/or semiconductor, any of which may have a selected or defined optical absorbance, reflectivity, and/or scattering characteristics. These characteristics may vary with spectral location; i.e., they may vary with the wavelength of impinging radiation. Examples of active coatings include coatings that provide optically switchable devices such as liquid crystal devices, suspended particle devices, and electrochromic devices. A brief overview of electrochromic devices is set forth, below.

Optically switchable devices are available for controlling tinting, reflectivity, etc., of window panes or lites. Electrochromic devices are one example of optically switchable devices. Electrochromism is a phenomenon in which a material exhibits a reversible electrochemically-mediated change in an optical property when placed in a different electronic state, typically by being subjected to a voltage change. The optical property being manipulated is typically one or more of color, transmittance, absorbance, and reflectance. One well known electrochromic material is tungsten oxide ($WO_3$). Tungsten oxide is a cathodically coloring electrochromic material in which a coloration transition, transparent to blue, occurs by electrochemical reduction, and the opposite transition, blue to transparent occurs by electrochemical oxidation.

Electrochromic materials may be incorporated into, for example, windows for home, commercial, and other uses. The color, transmittance, absorbance, and/or reflectance of such windows may be changed by inducing a change in the electrochromic material; i.e., electrochromic windows are windows that can be darkened or lightened electronically. A small voltage applied to an electrochromic device of the window will cause it to darken; reversing the voltage causes it to lighten. This capability allows for control of the amount of light that passes through the window, and presents an enormous opportunity for electrochromic windows to be used not only for aesthetic purposes but also for significant energy-savings, as the devices use very little energy and their use can result in huge savings in heating and cooling bills.

Certain embodiments employ all solid state and inorganic electrochromic devices. Such all solid-state and inorganic electrochromic devices, and methods of fabricating them, are described in more detail in U.S. patent application Ser. No. 12/645,111, titled, "Fabrication of Low-Defectivity Electrochromic Devices," filed on Dec. 22, 2009 and naming Mark Kozlowski et al. as inventors, and in U.S. patent application Ser. No. 12/645,159, titled, "Electrochromic Devices," filed on Dec. 22, 2009 and naming Zhongchun Wang et al. as inventors, both of which are incorporated by reference herein for all purposes.

Electrochromic and other thin film devices are often patterned by laser ablation along lines, e.g., in order to electrically isolate certain device layers and/or features from each other. Because such devices are typically very thin layers, on the order of less than a micron to a few microns thick, what are traditionally thought of as flat substrates, for the purposes of fabricating thin film devices, actually show surprising variation in planarity. This phenomenon is described in more detail below.

FIG. 1 schematically illustrates a scribing process on a coated substrate, 101, the substrate being nominally flat. Substrate 101 includes a transparent support, 103, and a coating, 105. In certain embodiments, support 103 is a glass sheet and coating 105 is an optically switchable device.

A scribe beam, 111, scribes coating 105 while coated substrate 101 translates with respect to scribe beam 111. For example, as a net result of the translation, the scribe beam strikes the substrate progressively from left to right. Scribe beam 111 is focused by a condensing lens, 113, to a focal point, 115. Focal point 115 provides sufficient radiant energy flux to scribe coating 105 at the location of focal point 115. Scribing typically involves ablation of the coating via focused energy, e.g., a laser.

During the course of scribing, substrate 101 moves with respect to scribe beam 111 as depicted by three scribe beam positions: 117, 119, and 121. In order to ensure that coating 105 is effectively scribed, focal point 115 should remain positioned on or very near coating 105. Therefore, a distance "D" between the coating and the condensing lens should be precisely maintained.

While coated substrate 101 is nominally flat, the coating elevation may have slight variations over the length of a scribe line. Examples of such variations in elevation include a hillock, 107, and an upturned edge, 109. Such variations are not uncommon in float glass and other transparent types of substrates conventionally used for optically switchable devices such as electrochromic devices. An upturned edge such as feature 109 depicted in FIG. 1 is commonly encountered with tempered glass, where the glass surface elevation may increase by as much as 2 millimeters to 4 millimeters over a lateral distance of about 30 millimeters to 50 millimeters on the glass surface.

A challenge in many scribing processes is to maintain the focal point of the scribe beam on the coating to be scribed. More precisely, in some embodiments, the focal point must remain positioned on a particular portion or surface of the coating. In the depicted embodiment of FIG. 1, focal point 115 is maintained on a lower surface of coating 105.

One convenient way to maintain the focal point 115 positioned on the proper surface of the coating 105 during a scribing process is to adjust the position of lens 113 to maintain separation distance D during the scribe process to account for variations in the elevation of coating 105 over the length of the scribe line. The required fine adjustments can be accomplished with a suitably fast feedback/control system that moves lens 113 up and down in response to detected changes in the elevation of coating 105. A suitable system includes a detection system for interfacing with the control/feedback system.

While the variations in position of coating 105 have been referred to as variations in "elevation," it should be understood that such references include horizontal or vertical variations, depending upon whether the substrate is oriented vertically or horizontally. That is, the distance D is a separation distance.

As explained, the maximum flux of radiant energy (the focal point) should correspond to the location of the electrochromic device or other surface feature to be scribed. One possible approach to addressing this challenge would involve using a scribe beam that is relatively insensitive to changes in distance D. Such a beam would have a relatively long focal point (i.e., long in the direction of beam propagation). The focal point length would be great enough to permit scribing over the full range of variations in D encountered in a substrate. The length of the beam that provides a relatively invariant radiant energy flux (the focal region) is sometimes referred to as the "depth of focus" of the beam. Achieving a depth of focus of greater than about ±500 µm (i.e., greater than 1000 µm total depth) is typically problematic. A depth of focus this great may make the spot area of the laser beam too great to effectively scribe. Further, the separation distance of the laser optics (e.g., the condensing lens) from the tool may be too great. In some embodiments, suitable depth of focus ranges are about ±100 µm or less, or about ±50 µm or less. Therefore, the depth of focus of a scribe laser is typically too short to allow the system to operate without adjusting the lens position in order to maintain a separation of D.

There are various possible focus control mechanisms that can be incorporated in a scribe system to ensure that the focus of the scribe laser remains aligned with the scribe height of the surface being scribed. One type of design employs confocal detection and patterning beams. A detection beam is used to determine the distance between the scribe surface and a frame of reference. Generally a confocal system is one where the patterning and detection beams (or any other two beams) share the same focus. They may, in typical embodiments, share some the same optics such as the same condensing lens. A challenge of the confocal system is that when the optics encounter a highly sloped surface, the detection beam may reflect at such a steep angle that it will not be captured by the systems optics, and therefore be unable to read the surface position. The challenge with a confocal system as described is that, because the capture optics are the same as the patterning optics and those optics cover only a relatively small region of the angular space above the surface being scribed, it is easy for the reflected detection beam to pass outside these optics.

Another type of detection system that may be used to keep the scribe system in focus is a triangulation sensor. These systems will work well so long as the triangulation sensor can be positioned on the opposite side of the substrate from the side approached by the scribe beam. However, measurement from the opposite side of the substrate is not always feasible, as the work piece may be large enough that the scribing and detection optics cannot be connected mechanically between the top and bottom surfaces of the substrate. This configuration requires an additional, separate axis to move the sensing device in coordination with the vision or patterning head, complicating the design. As described in more detail below, if the triangulation detector is located on the same side of the work piece as the scribe laser, it may block passage of the scribe laser. The function and form of a triangulation sensor are described in more detail below in relation to FIGS. 2 and 3.

Another type of surface focus control mechanism employs a look-ahead mechanism. In this mechanism, the sensor, which may be a triangulation sensor or other suitable device, is presented at a location that is co-linear with the scribe beam along the direction of travel of the substrate, but upstream so as to map the topography upstream of the scribe beam in anticipation of the arrival of the scribe beam. The system applies a phase delay to the measured focus signal that is scaled as a function of both the relative horizontal velocity between the sensor and the substrate and the horizontal distance between the measurement and scribe locations. Such techniques require monitoring of the horizontal velocity between the substrate and detection or patterning tools. This considerably increases the complexity of the detection system. Moreover, because there is some flexure in transparent substrates, especially large substrates, the distance measured by the upstream detector may actually have changed due to flexure by the time that point on the substrate is aligned with the scribe focal point.

Yet another type of design employs a low angle of incidence sensor system. The incident beam optics and the reflected beam optics must therefore be widely separated and the detector must be large enough to capture specularly reflected beams that encounter undulating surface topology. Thus, these sensors often have larger footprints. Such larger sensors can prohibitively take up valuable space in a processing environment.

Figure 2:
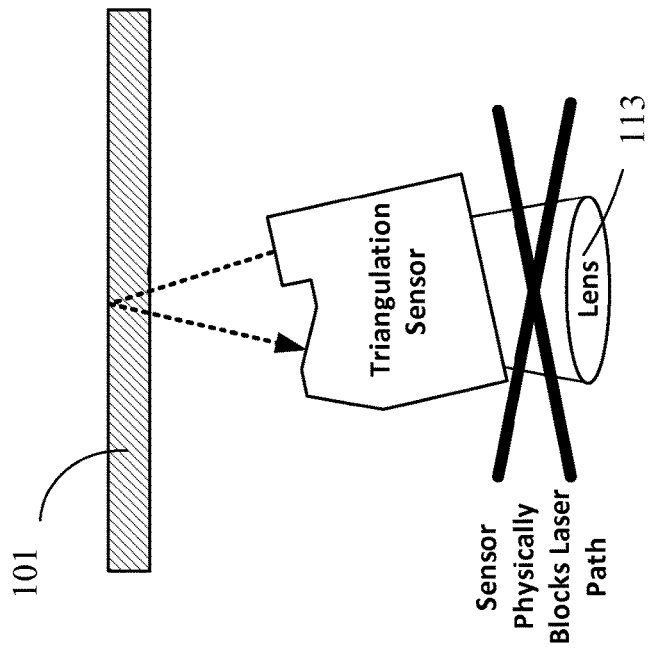
FIG. 2 shows a schematic diagram illustrating the use of an original equipment manufacturer (OEM) triangulation sensor to measure coaxial to a process from the same side of the substrate from which the process is performed.
Figure 2:
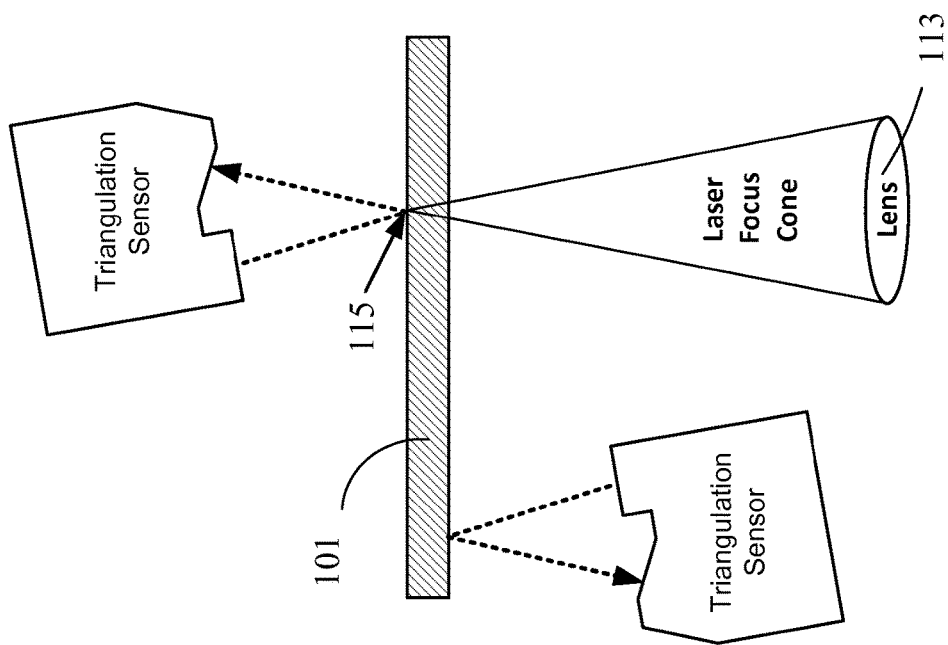

Referring again to FIG. 1, the scribe laser beam path in most patterning systems ends in a focusing lens that focuses laser power to a focal plane at the surface to be patterned. The same is true for most precision vision systems, as the vision optics must be focused at the plane of interest, typically over a range of ~1 mm to ~100 mm between the focusing lens and the substrate. Referring to FIG. 2, in the rendering on the left side, the laser path (laser focus cone, or focal cone) between focusing lens 113 and focal point 115 is depicted. In most cases, the path is nominally perpendicular to the substrate, and the cone shaped region between the lens and focal plane must remain completely unobstructed in order to prevent loss/distortion of the laser power profile or vision illumination collection field.

Triangulation sensors are sensitive to angle of incidence and, conventionally, must be placed perpendicular to the surface to be located in one axis and angled either perpendicularly in the other axis (for measuring distance to opaque objects) or slightly tilted from perpendicular (for specular reflection on transparent object surfaces). Referring again to the left-hand rendering in FIG. 2, as described above, conventionally, a triangulation sensor, when perpendicular to the substrate, is either configured at some lateral distance from the optical path, in order to avoid blocking the optical path, or placed on the opposite side of the substrate coaxially with the optical path. The triangulation sensor must project a beam (indicated by the dashed line) to the substrate and a detector within the sensor receives the reflected beam (this is described in more detail below in relation to FIG. 3). A triangulation sensor may have separate source and detector components, or as commonly is the case, the components are housed in a single unit as depicted in FIG. 2. Although embodiments herein are described in terms of a single structure containing both an incident beam source and a detector, triangulation sensor embodiments are meant to include not only where these components are configured in a single structure, enclosure, or unit, but also where these components are in or part of separate structures, enclosures, or units.

To use a conventional triangulation sensor, e.g., an original equipment manufacturer (OEM), "off the shelf" sensor, to measure coaxial to a beam process from the same side of the substrate from which the process is performed, the sensor would need to be placed directly in the optical path of the process. This is illustrated in FIG. 2, in the right-hand rendering. In this configuration, the triangulation sensor can function, but the optical path, e.g., the laser scribe beam, is blocked as it exits focusing lens 113 and therefore cannot impinge upon substrate 101. Embodiments described herein overcome this issue and allow a triangulation sensor to be positioned on the same side of a substrate as the optical path, e.g., the laser scribe beam, and while having its incident beam at least coincident with the focal area of the optical path, while accommodating, not blocking, the focal cone. As described herein, this configuration describes a triangulation sensor that is "optically integrated" with the optical path of another process. It is to be noted that although in some embodiments, triangulation sensors are described as being configured on the same side of the substrate as an optical processing tool, e.g., a scribe laser, this is not necessary. By folding the beam path of a triangulation sensor, embodiments described herein allow for a more compact system, which allow for greater flexibility in configuring the sensors on either side of a substrate during processing.

Certain embodiments described herein employ a triangulation sensor path optically integrated with a patterning laser (e.g., for scribing a substrate) or a vision optics path (e.g., for optical inspection or machine vision). In some cases, an OEM triangulation sensor is employed. Examples of suitable OEM triangulation sensors include the Keyence LK-G5000 series sensors (Keyence Corporation of America, Itasca, Ill.) and the Omron ZS-HL series sensors (Omron, Schaumburg, Ill.). The triangulation-based detection system may be designed or configured to simultaneously measure multiple surface heights of a transparent substrate. These can include multiple layers of a multi-layer optical switching device, and possibly one or more layers of a transparent substrate.

The triangulation sensor may employ an optics set that provides an incident beam that provides for a method of measuring distance to the substrate that is equivalent to a sensor that is coaxial to a vision or patterning laser optics path but while not blocking the vision or laser optics path. An optics set may be only a focusing lens, but may include further optical elements. Measurements with the triangulation sensor and associated optics may be made from a large distance from the substrate (e.g., about 50 mm or more). Using triangulation-type detection systems as described herein, a scribe system can accept a wide range of deviations in substrate angle from perpendicular (e.g., at least about ±3 degrees).

Figure 3:
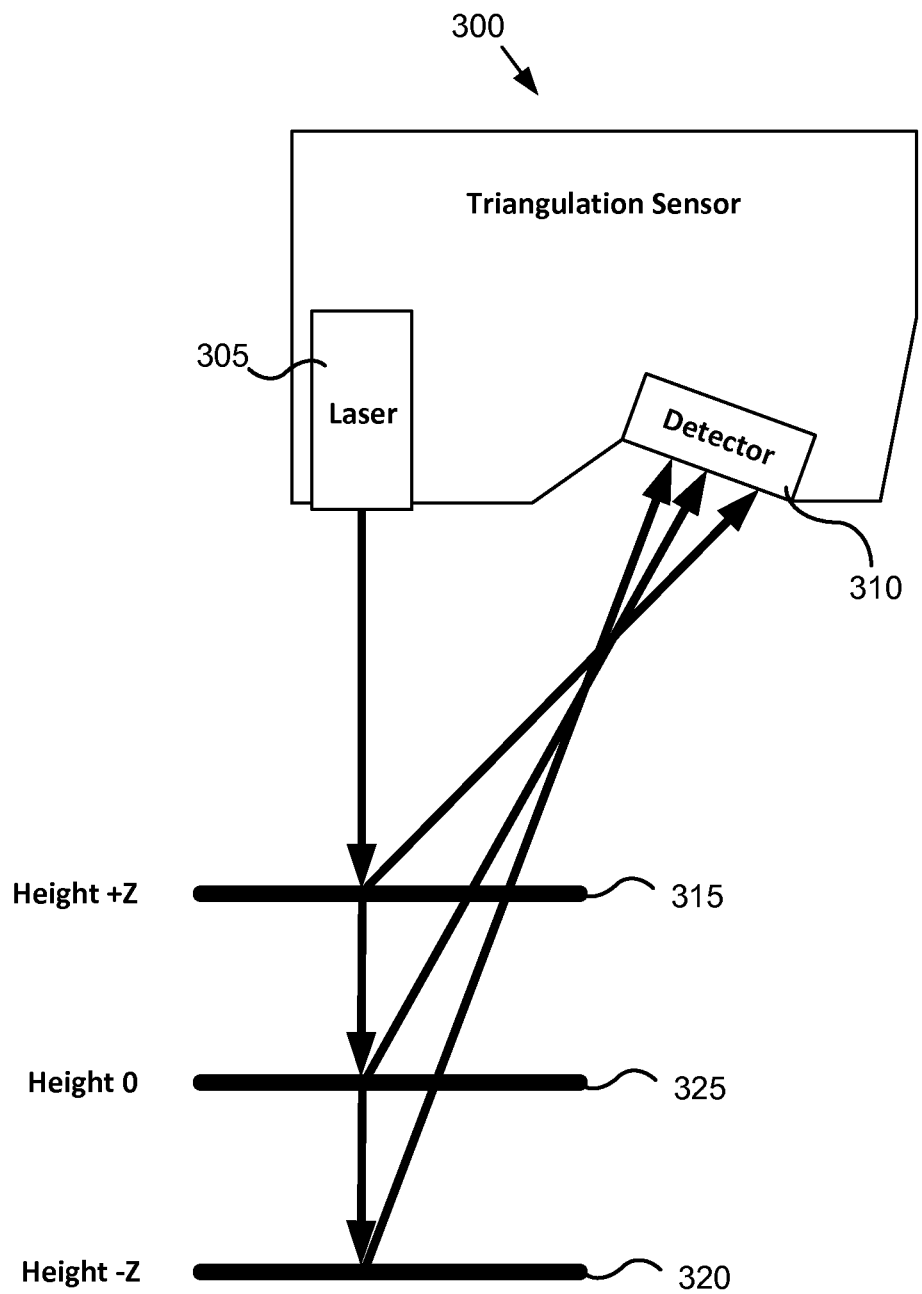
FIG. 3 shows a schematic diagram of a general triangulation sensor.

FIG. 3 shows a schematic diagram of a generalized triangulation sensor. A triangulation sensor, 300, includes a laser, 305, and a detector, 310. In some embodiments, laser 305 may be a low power laser that does not scribe or melt a substrate but is reflected from the substrate. In some embodiments, detector 310 may be a charge coupled device (CCD). Detector 310 is positioned at fixed angle from a laser beam that is projected from laser 305.

In operation, triangulation sensor 300 projects a laser beam from laser 305 onto the surface of a substrate. The laser beam is reflected from the surface of the substrate and onto different regions of detector 310. From the region of detector 310 that the laser beam is reflected onto, the distance of the substrate from triangulation sensor 300 can be determined. For example, as the substrate moves up or down, the lateral movement as detected by detector 310 is converted to a distance reading between triangulation sensor 300 and the substrate surface.

Triangulation sensor 300 is able to determine a distance of the substrate from triangulation sensor 300. For example, triangulation sensor 300 is able to determine any distance between a minimum distance when the substrate is at a position, 315, to a maximum distance when the substrate is at a position, 320. The triangulation sensor may be set or calibrated to measure a nominal distance, which is encountered when the substrate is at a position, 325.

Figure 4:
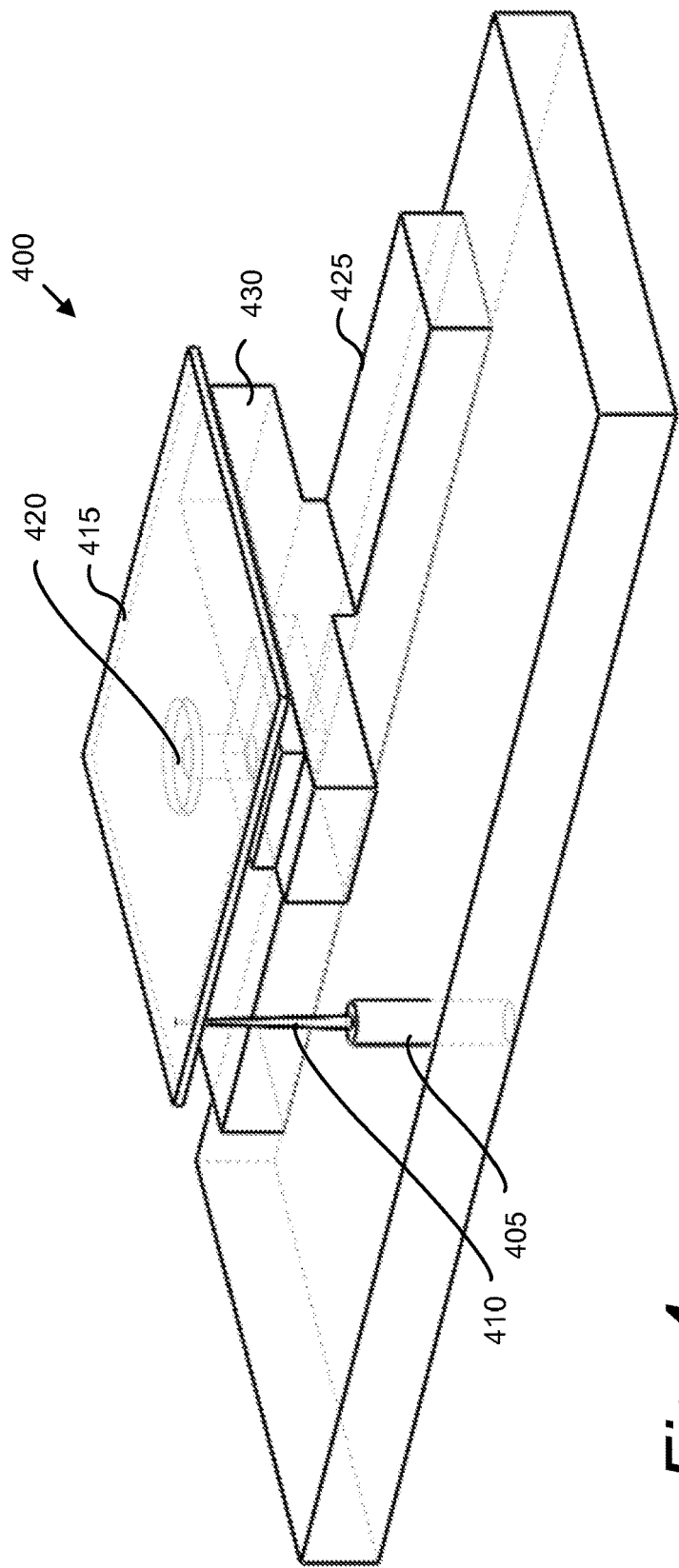
FIG. 4 shows a schematic diagram of a scribing apparatus.

FIG. 4 shows a schematic diagram of a scribing apparatus, 400. Scribing apparatus 400 may be configured for scribing an electrochromic lite. Other substrates and/or lites may also be scribed with scribing apparatus 400. Scribing apparatus 400 may be used for isolating electrodes of an electrochromic device on an individual electrochromic lite, for example.

Figure 5:
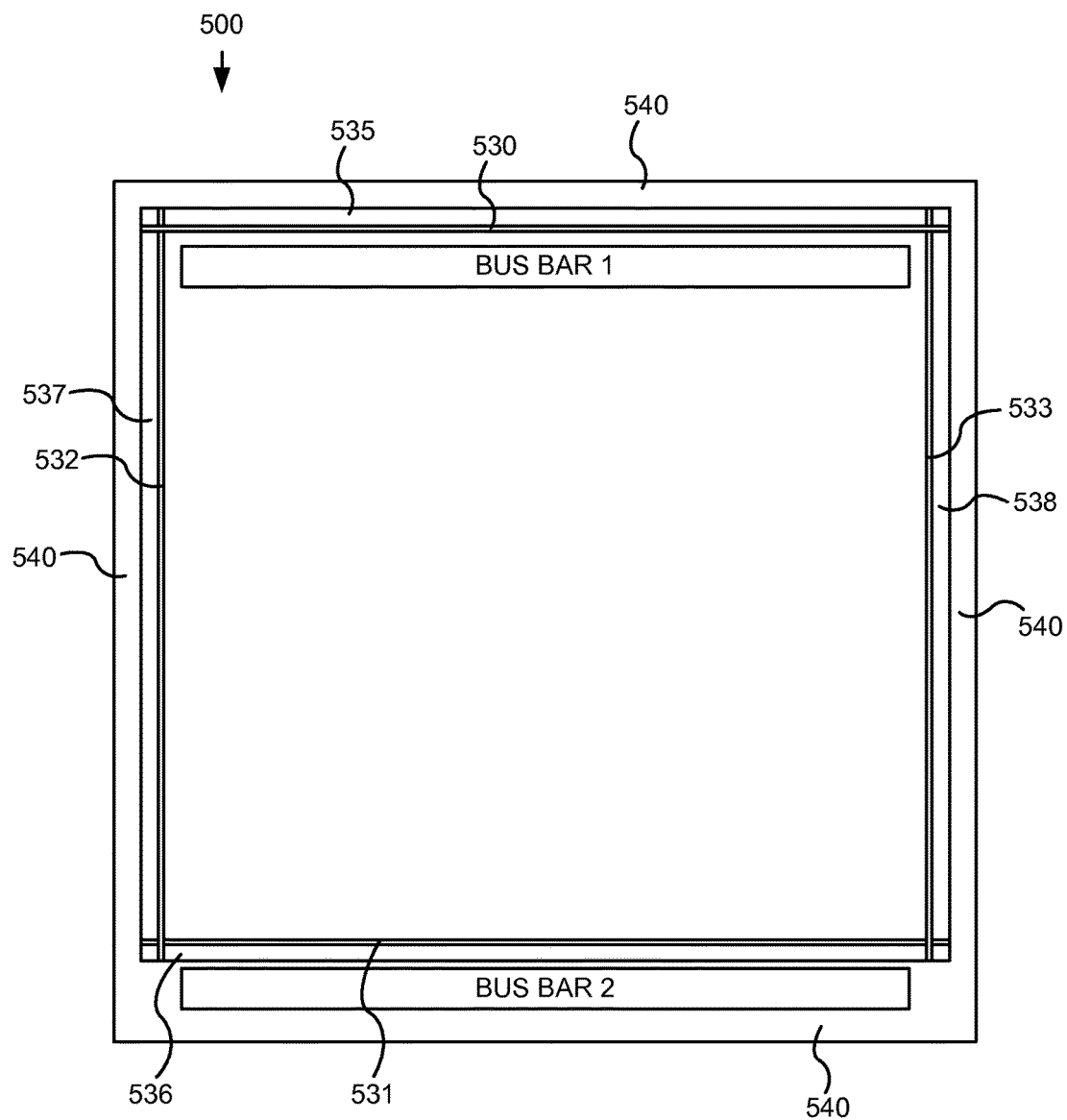
FIG. 5 shows a top-down schematic diagram of an electrochromic lite.

FIG. 5 shows a top-down schematic diagram of an electrochromic lite. After formation of an electrochromic device on an electrochromic lite, 500, laser scribing is performed. Electrochromic lite 500 includes a first and a second transparent conducting oxide layer and an electrochromic device or stack between the two transparent conducting oxide layers. Areas, 540, are areas from which the electrochromic device has been removed from electrochromic lite 500. In this example, areas 540 form a perimeter region surrounding scribe lines, 530, 531, 532, and 533 which pass through the second transparent conducting oxide layer and all, or some, of the electrochromic device layer or layers, but not the first transparent conducting oxide layer. Scribe lines, 530, 531, 532, and 533 are made to isolate portions of the electrochromic device, 535, 536, 537, and 538 that were potentially damaged during edge deletion from the operable electrochromic device. In one embodiment, scribe lines 530, 532, and 533 pass through the first transparent conducting oxide layer to aide in isolation of the device (scribe line 531 does not pass through the first transparent conducting oxide layer, otherwise it would cut off bus bar 2's electrical communication with the first transparent conducting oxide layer and thus the electrochromic stack). One of ordinary skill in the art would appreciate that the scribing can be performed at different depths and/or performed in a single process whereby the laser cutting depth is varied, or not, during a continuous path around the perimeter of the electrochromic device.

Returning to FIG. 4, scribing apparatus 400 includes a scribe laser, 405, that emits a scribe beam, 410, for scribing a substrate, 415. Substrate 415 is held by a gripping mechanism, 420, of scribing apparatus 400. An X-stage, 425, and a Y-stage, 430, are configured to translate substrate 415 horizontally so that scribe lines may be formed in the substrate or a device disposed on the substrate. Gripping mechanism 420 may include a vacuum gripping mechanism, brackets, or other mechanism configured to hold substrate 415.

Scribe laser 405 of scribing apparatus 400 may be a pulse-type laser such as a diode-pumped solid state laser. For example, the scribe laser may be a suitable laser from IPG Photonics (of Oxford, Mass.) or Ekspla (of Vilnius, Lithuania). In some embodiments, two or more scribe lasers may be part of scribing apparatus 400. In some embodiments, a scribe laser has an output power of greater than about 500 milliwatts (mW). In some embodiments, the output power of a scribe laser can be adjusted to control the depth of a scribe line to be formed.

In some embodiments, scribing apparatus 400 may be positioned to direct a scribe beam to interact with a bottom surface of a layer or stack on a substrate to be scribed (i.e., the interface between the stack and the substrate). To facilitate this, an electrochromic device may be disposed on one side of substrate 415 and scribing apparatus 400 may be positioned on the other side of the substrate. In some embodiments, focusing the scribe beam on the bottom surface of the layer or stack allows the scribe beam to ablate all of the layers of a multi-layer device (e.g., such as an electrochromic device) simultaneously. When the scribe beam contacts the electrochromic device it ablates the material from the device, and the ablated material is captured by a cleanup device located proximate to the area where the scribe beam contacts the device. In some embodiments, the cleanup device is a vacuum device located in close proximity to the substrate in order to suck away the ablated material without allowing it to fall onto the electrochromic device. In some embodiments, an air knife may be used in conjunction with, or alternatively to, the vacuum source. In some embodiments, the debris catching device and scribe laser 405 are positioned along an axis and are allowed to move together along that axis.

In some embodiments, the scribe beam being directed through a transparent substrate and onto the lower face of an electrochromic device may make it easier to remove the electrochromic device from the substrate. Because an electrochromic device is generally made from multiple layers of different materials, each layer having its own absorption characteristics, it may be desirable to selectively remove one or more layers without removing the entire electrochromic stack. This selective ablation can be achieved, e.g., with a scribe beam having a single wavelength of radiation. For example, a single wavelength of radiation may be appropriate and/or optimized for removal of one of multiple layers in an electrochromic stack. For example, the wavelength of a laser beam is optimized or tuned for removal of the outermost layer of an electrochromic device (e.g., the layer of the electrochromic device furthest from the substrate on which the electrochromic device is disposed), while leaving the underlying layers unablated. In another example, a laser beam is optimized or tuned for ablation of an intermediate layer and/or the bottom layer of the electrochromic device. Typically, but not necessarily, this is done after overlying layers are removed.

Alternatively, in an embodiment in which the scribe beam is directed through a transparent substrate and onto a lower face of the electrochromic device, the wavelength of the scribe beam may be optimized or tuned for removing the lowermost or bottom layer of the electrochromic device. Removing the lowermost or bottom layer of the electrochromic device may also remove any layers overlying the lowermost or bottom layer. For example, the mechanical and or thermal damage caused by the scribe beam to the lowermost or bottom layer may cause the upper layers to ablate away concurrently with the lower layer.

In a scribing process, a face of an electrochromic lite to be scribed may be defined by an X-Y plane. The lite may move in the X direction or the Y direction at a rapid rate with respect to the scribing apparatus and the scribe laser may scribe the lite as is moves. In some embodiments, the lite may move at about 1 meter per second (m/s) with respect to the scribing apparatus. Further, the scribe laser of the scribing apparatus may move in the Y direction (or other direction in the X-Y plane) as needed. As the electrochromic lite moves in the X-Y plane with respect to the scribe laser, a triangulation-based distance sensor (not shown) may determine the distance between the electrochromic lite and the scribe laser; this distance may vary, as explained above. The scribing apparatus may adjust the scribe laser such that the scribe beam is focused at the same interface (e.g., the interface of the lite and the bottom layer of the electrochromic device), as determined by the triangulation-based distance sensor.

For example, in a scribing process, the scribe laser may initially be held in a Y-position. The lite may move past the scribe laser in an X-direction to form a first scribe line with the scribe laser along one edge of an electrochromic device disposed on the lite. Then, the scribe laser is turned off and the scribe laser is moved across the width of the lite to a different Y-position. The lite is again translated in the X-direction to make a parallel scribe line on the opposite side of the lite surface. In some embodiments, the lite moves in a positive X-direction during generation of the first scribe line and in the negative X-direction during generation of the second scribe line. In some other embodiments, the lite may be repositioned to its initial starting point prior to making the second scribe line. To make a scribe line in a perpendicular direction along a perpendicular edge of the lite, the lite may be rotated by 90 degrees and passed over the scribe beam.

Other embodiments of a scribing process are possible. In some embodiments, the scribe laser may be fixed and lite may move. In some embodiments, the scribe laser may move and the lite may be fixed. In some embodiments, both the scribe laser and the lite may move. In some embodiments, the scribe laser is always fixed. In some other embodiments, the scribe laser moves when scribing in the Y-direction, but is fixed when the lite moves when scribing in the X-direction. In such embodiments, the lite may not need to be rotated in a scribing process. For example, gripping mechanism 420 may be rotatable about an axis perpendicular to the plane of the substrate.

A scribing process may be performed at the appropriate times in the fabrication of an electrochromic device on a lite. In some embodiments, scribe lines may be formed after the electrochromic device is fabricated. In some embodiments, scribe lines may be formed in a conductive layer on the lite prior to depositing further electrochromic device layers. For example, for a rectangular electrochromic device disposed on a rectangular lite, one scribe line may be formed along one edge of the conductive layer on the lite prior to depositing electrochromic device layers, further electrochromic device layers may be deposited, and then three scribe lines may be formed along the remaining edges of the lite. Further description of scribing electrochromic lites may be found in U.S. patent application Ser. No. 12/941,882, filed on Nov. 8, 2010, and entitled "ELECTROCHROMIC WINDOW FABRICATION METHODS," which is incorporated by reference herein for all purposes.

Figure 6:
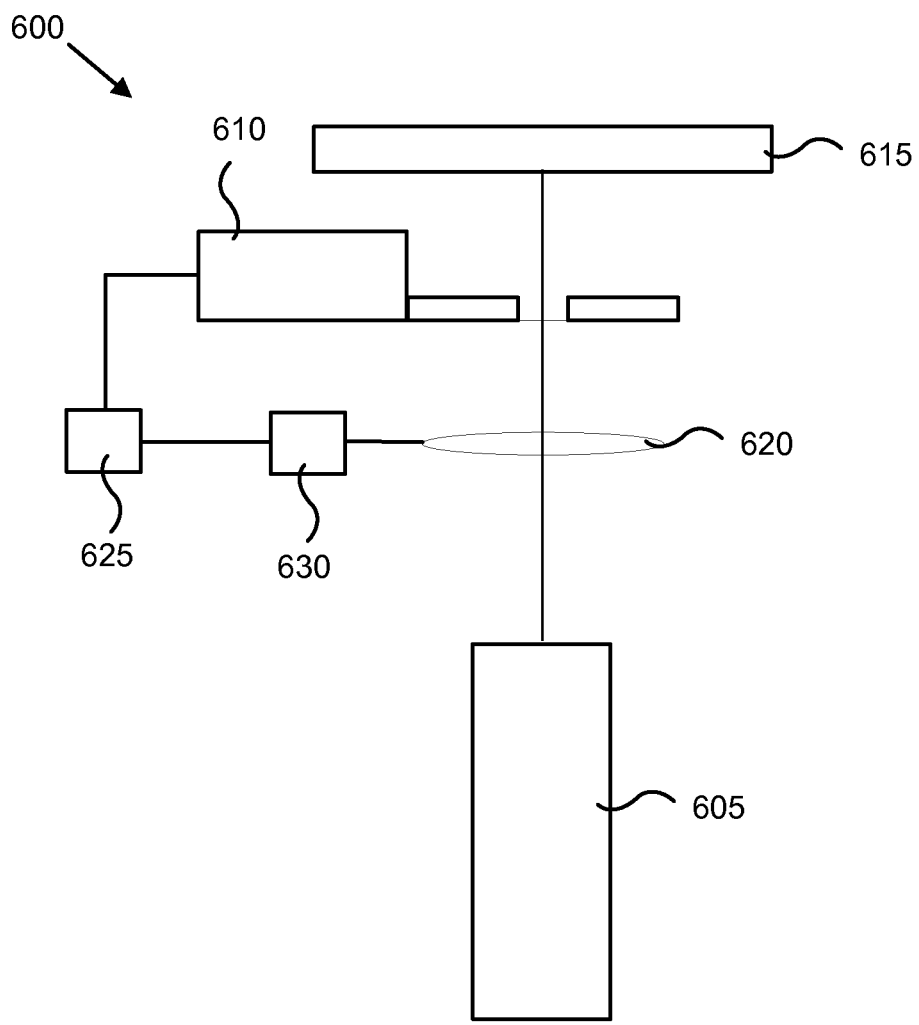
FIG. 6 shows a block diagram of a scribing apparatus including a triangulation-based distance sensor.

FIG. 6 shows a block diagram of a scribing apparatus including a triangulation-based distance sensor. A scribing apparatus, 600, may be similar to scribing apparatus 400 shown in FIG. 4. Scribing apparatus 600 includes a scribe laser, 605, and a triangulation-based distance sensor, 610. A substrate, 615, is held in a holding mechanism (not shown) of scribing apparatus 600. Optics, 620, are used to focus a scribe beam from scribe laser 605 onto substrate 615 at a position to be scribed. In some embodiments optics 620 includes a focusing lens. In some embodiments, the holding mechanism may hold substrate 615 in a substantially fixed position with respect to optics 620 during a scribing process.

In some embodiments, scribing apparatus 600 further includes a first translation stage (not shown) and a second translation stage (not shown). The first translation stage is configured for moving substrate 615 in a first direction (e.g., the X-direction, when the substrate is taken to be substantially in an XY plane) with respect to optics 620. The second translation stage is configured for moving substrate 615 in a second direction (e.g., the Y-direction, when the substrate is taken to be substantially in an XY plane) with respect to optics 620. The second direction may be orthogonal to the first direction. Further, the first translation stage and the second translation stage may be configured to move substrate 615 substantially orthogonal to the direction of propagation of the scribe beam. As the first and/or the second translation stages move substrate 615, a scribe line is formed in substrate 615 by the scribe beam.

Triangulation-based distance sensor 610 determines the point on which the scribe beam is to be focused on the substrate (e.g., the position in the Z-direction of the substrate the scribe beam is to be focused). For example, in the case of a lite with an electrochromic device disposed on the lite, as described with respect to FIG. 4, triangulation-based distance sensor 610 may be used to detect the position of the electrochromic device/lite interface. A signal from triangulation-based distance sensor 610 indicating the desired focal point of the scribe beam may be fed to logic such as an appropriately designed or configured processor, 625. Processor 625 may then determine (e.g., calculate) a compensating action to direct a beam focus adjustment mechanism, 630, to adjust optics 620 to maintain the scribe beam focal point on the desired region of substrate 615. In some embodiments, processor 625 may include a closed loop, proportional-integral-derivative (PID) controller. For example, optics 620 may be adjusted to cause a focal point of the scribe beam to follow contours of substrate 615 as substrate 615 moves with respect to the scribe beam during scribing. Beam focus adjustment mechanism 630 may include a stage that holds optics 620 and is configured to move in the Z-direction, which is typically the direction of propagation of the scribe beam. Beam focus adjustment mechanism 630 also may include a motor that is able to move optics 620 in the Z-direction to adjust the focal point of the scribe beam on substrate 615. In some embodiments, beam focus adjustment mechanism 630 includes a linear motor, a rotary cam system, a voicecoil, or other mechanism capable of providing the push/pull force and bandwidth required to move optics 620 quickly enough to track changes in the Z-position of substrate 615. Triangulation-based distance sensors and associated reflecting elements are described further, below, with respect to FIGS. 7A-7C and 8A-8D.

Figure 7A:
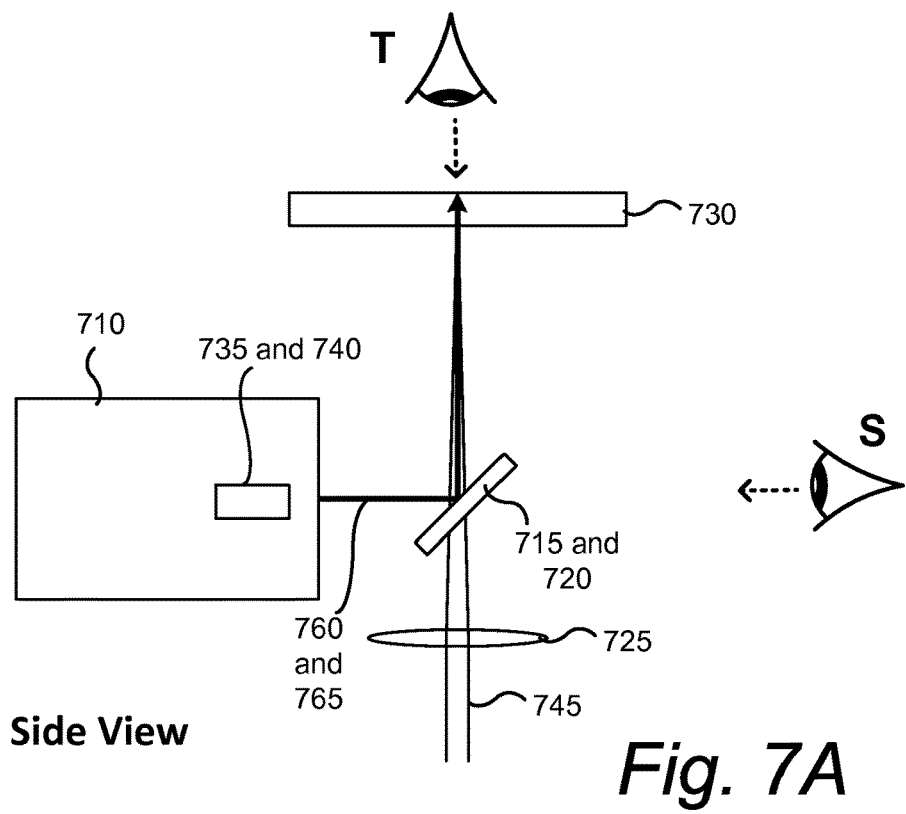
FIGS. 7A-7C show schematic diagrams of a triangulation-based distance sensor, associated reflecting elements, and focusing optics for a scribe beam.
Figure 7B:
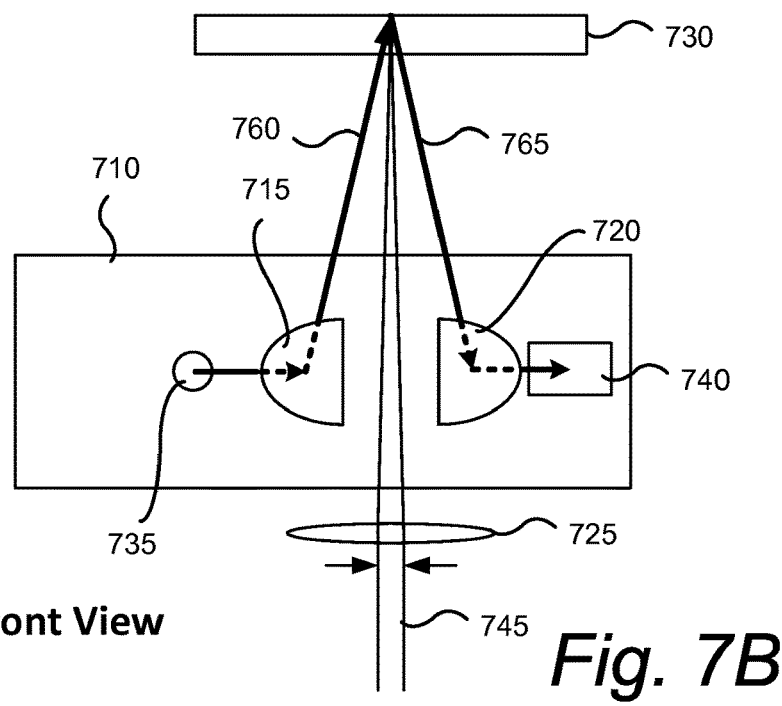
Figure 7C:
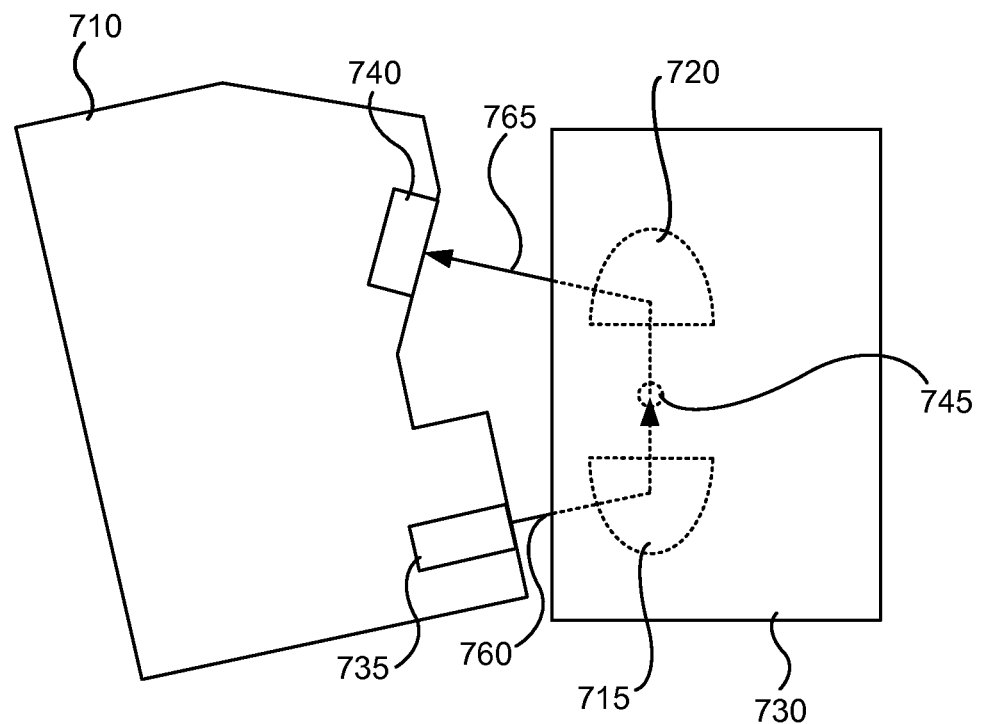

FIGS. 7A-7C show schematic diagrams of a triangulation-based distance sensor, associated reflecting elements, and focusing optics for a scribe beam. FIG. 7A shows a side view. FIG. 7B shows a front view; i.e., from point S in FIG. 7A. FIG. 7C shows a top-down view; i.e., from point T in FIG. 7A. The depicted arrangement permits the triangulation detection system to be positioned on the same side of the substrate as the scribe system, without blocking or otherwise interfering with the propagation or focusing of the scribe beam.

As shown in FIGS. 7A-7C, a triangulation-based distance sensor, 710, has two reflecting elements, 715 and 720, associated with it. In some embodiments, reflecting elements 715 and 720 are mirrors. Optics, 725, adjust the focal point of a scribe beam, 745, onto a substrate, 730. In some embodiments, optics 725 includes a focusing lens. In some embodiments, the focal point of scribe beam 745 has a length (or a depth of focus) of not more than about 1200 micrometers (i.e., ±600 micrometers) along the axial direction of the scribe beam. Note that in FIG. 7C, substrate 730 is above reflecting elements 715 and 720; dashed lines indicating reflecting elements 715 and 720 that are positioned under substrate 730 are shown in this figure. See FIG. 7A for the relative position of substrate 730 and reflecting elements 715 and 720.

To determine a distance between triangulation-based distance sensor 710 and substrate 730, a detection beam source, 735, issues an incident beam, 760. In some embodiments, detection beam source 735 is a low power laser. Incident beam 760 is reflected from reflecting element 715 at about 90 degrees and onto substrate 730. When incident beam 760 is reflected from substrate 730, reflected beam, 765, is created. Reflected beam 765 is reflected from reflecting element 720 and onto a detector, 740. In some embodiments, detector 740 is a CCD. The position of reflected beam 765 on detector 740 provides an indication of a distance between triangulation-based distance sensor 710 and substrate 730.

FIGS. 7A and 7B show the path of scribe beam 745 through optics 725 and onto substrate 730 to scribe substrate 730 (or any devices/materials on substrate 730), where scribe beam 745 impinges substrate 730. Triangulation-based distance sensor 710 and the associated reflecting elements 715 and 720 are positioned such that incident beam 760 from triangulation-based distance sensor 710 is directed to a location on or proximate the scribe position; i.e., the focal point of scribe beam 745. For example, in some embodiments, the position on the substrate of incident beam 760 is nominally centered on top of the scribe position when the focal plane is positioned at the nominal distance to triangulation-based distance sensor 710; the nominal distance of substrate 730 from triangulation-based distance sensor 710 is described further with respect to FIGS. 8A, 8C, and 8D.

As the substrate moves up or down, away from the nominal position, a gradual offset is introduced. The maximum offset depends on the exact configuration of the scribing apparatus, the thickness of substrate 730 (e.g., when the focal point of scribe beam 745 is on the opposite side of substrate 730 that scribe beam 745 impinges on), angle of incidence of incident beam 760, etc. In some embodiments, the offset between incident beam 760 and scribe beam 745 may be about ±0.5 millimeters in both the X-direction and the Y-direction.

In some embodiments, the wavelength of scribe beam 745 may be different than the wavelength of incident beam 760 and reflected beam 765 so that scribe beam 745 does not interfere with triangulation-based distance sensor 710. If scribe beam 745 and incident beam 760 had the same wavelengths, reflections or scattering of scribe beam 745 from substrate 730 may be detected by detector 740. In some embodiments, the wavelength of scribe beam 745 is about 1064 nanometers (nm) and the wavelength of incident beam 760 is about 650 nm. As described above with respect to FIG. 6, optics 725 may be adjusted to cause a focal point of scribe beam 745 to follow contours of substrate 730 as substrate 730 moves with respect to scribe beam 745 during scribing.

In summary, reflecting element 715 reflects the distance detector's incident beam 760 from its emitted direction, which may be, as in this example, generally parallel to the plane of the substrate (or to the X-Y plane of the scribe system; the incident beam may also be at some other angle, but not 180° (in line with scribe beam) as that would place the triangulation sensor in the path of the scribe beam), to a direction toward the substrate, and causes incident beam 760 to contact the substrate at or near the point where the scribe beam contacts the substrate. Incident beam 760 reflects from the substrate surface as reflected beam 765, which propagates to reflecting element 720. Element 720 in turn directs reflected beam 765 back toward triangulation-based distance sensor 710, where its position is measured as it strikes detector 740. This allows triangulation-based distance sensor 710 to be placed outside of the path of scribe beam 745. Reflecting elements 715 and 720 straddle the focus cone of scribe beam 745 such that incident beam 760 and reflected beam 765 of triangulation-based distance sensor 710 impinge substrate 730 at a location on or proximate to the scribe position.

Figure 7D:
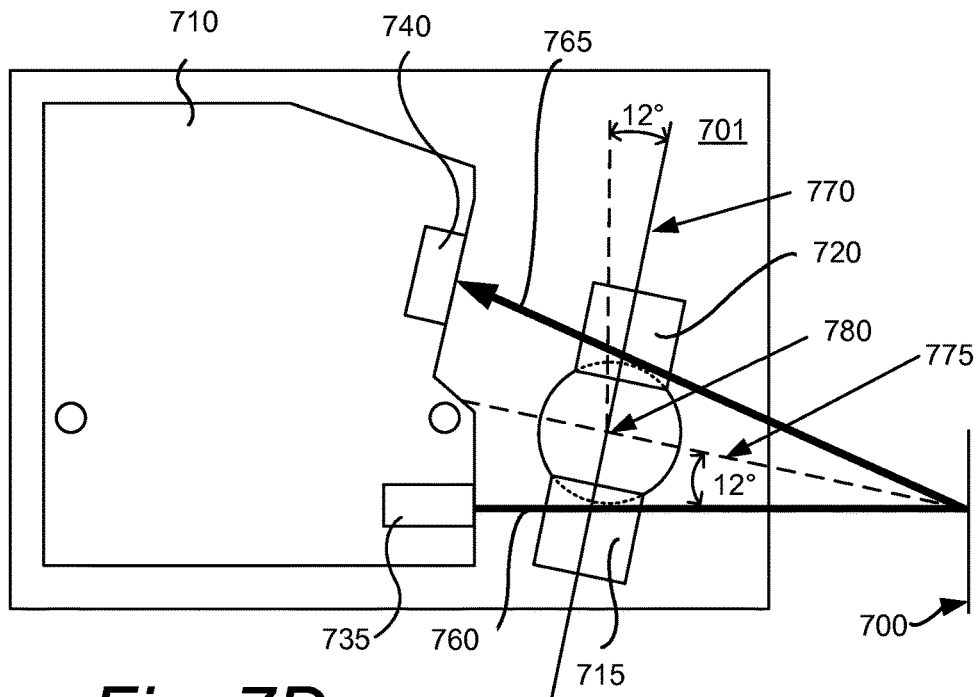
FIGS. 7D and 7E show schematic diagrams of a triangulation-based distance sensor and associated reflecting elements before and after the incident and reflected beams of the triangulation-based distance sensor are folded with the reflecting elements.
Figure 7E:
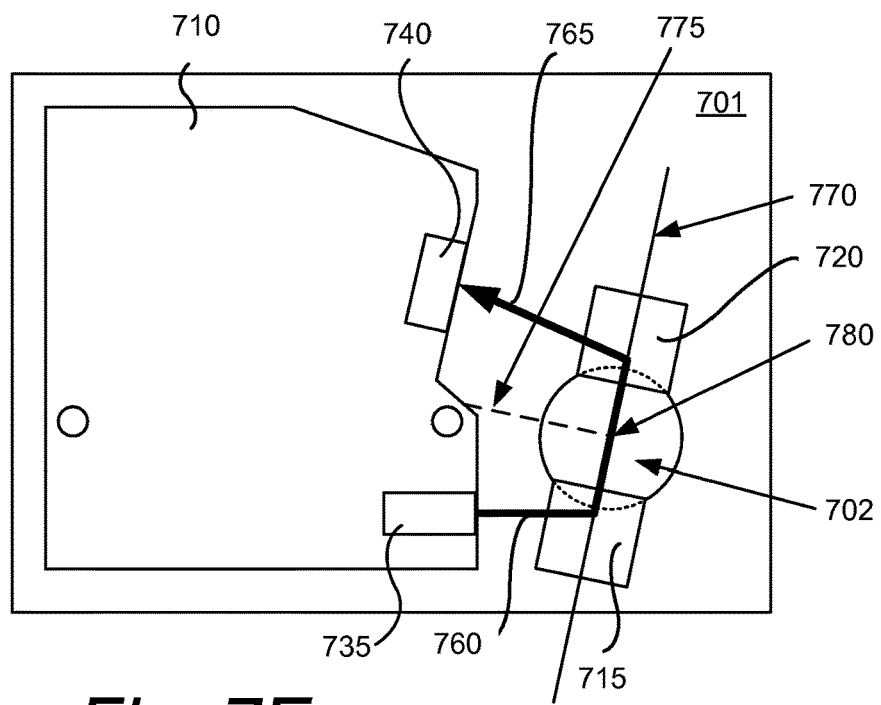

For further context, FIGS. 7D and 7E show schematic diagrams of triangulation-based distance sensor 710 oriented as depicted in FIGS. 7A-C, showing the path of incident beam 760 without, and with, folding by reflecting elements 715 and 720. Triangulation sensor 710 is depicted as mounted on a stage, 701, in which there is an aperture, 702, through which the scribe beam may pass, perpendicular to stage 701. Referring to FIG. 7D, assuming the incident beam passes through reflectors 715 and 720 without change and assuming a theoretical reflecting surface, 700, the incident beam would be reflected back to sensor 710 and remain in same plane from which it was projected. Referring to FIG. 7E, reflecting elements 715 and 720 fold the beam path by about 90 degrees around a line, 770, perpendicular to a center line, 775. Center line 775 of the beam path is defined by the line that splits incident beam 760 and reflected beam 765 at their intersection (incident beam 760 and reflected beam 765 form an about 24 degree angle at their intersection in this example). The first reflecting element 715 angles the beam up and about 12 degrees toward a center, 780, also of the focal point of scribe beam 745. When the incident beam strikes the substrate, which is substantially parallel to stage 701, it is reflected down, at about 12 degrees from normal to the substrate, forming a symmetrical path between the reflectors centered at 780. The second reflecting element 720 reflects beam 765 to the detector of triangulation-based distance sensor 710. Note, in this example, the bases of reflecting elements 715 and 720 are rectangular, and these rectangular bases are rotated 12 degrees within the plane of stage 701, relative to a line parallel to the face of sensor 710 having detector 740.

Figure 8A:
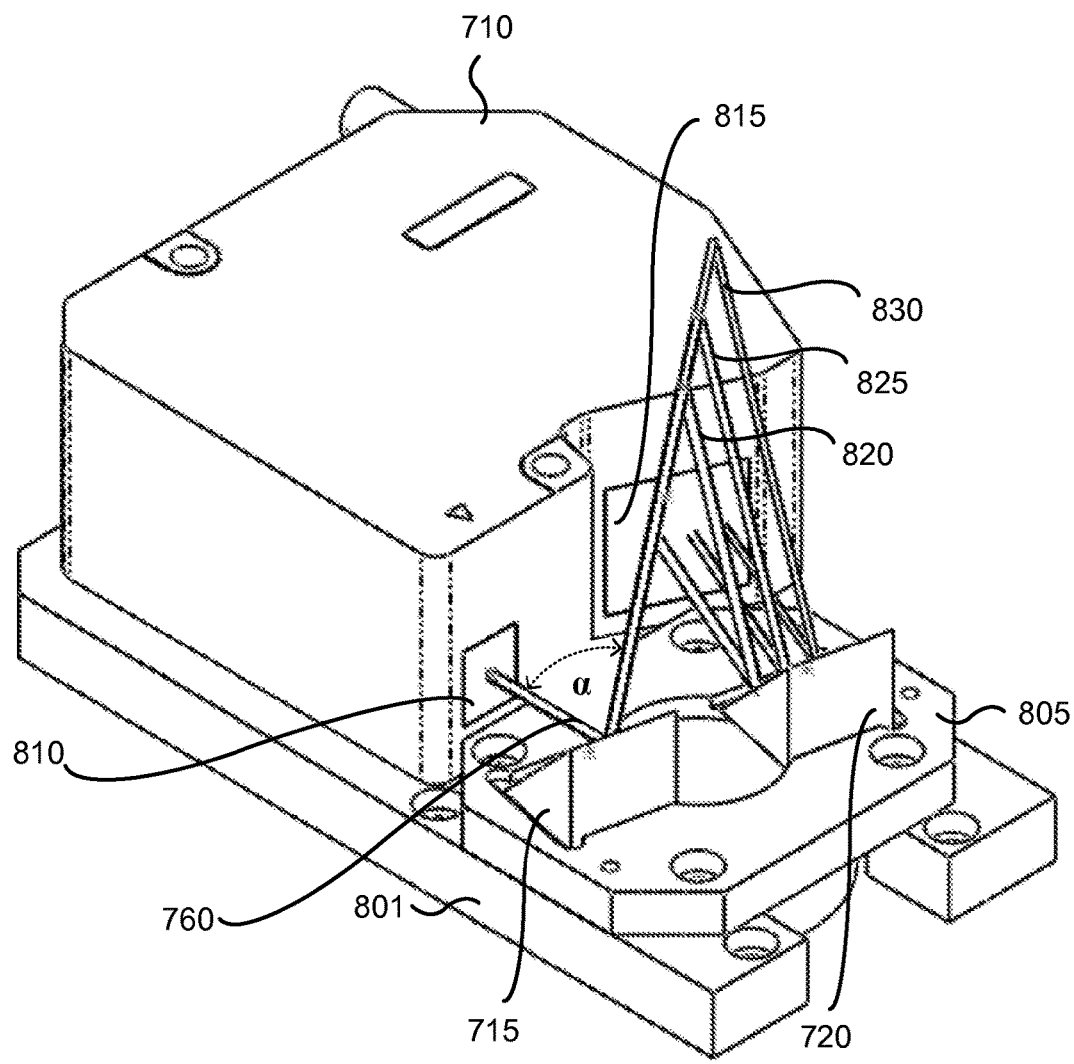
FIGS. 8A-8D show schematic diagrams of a triangulation-based distance sensor and associated reflecting elements.
Figure 8B:
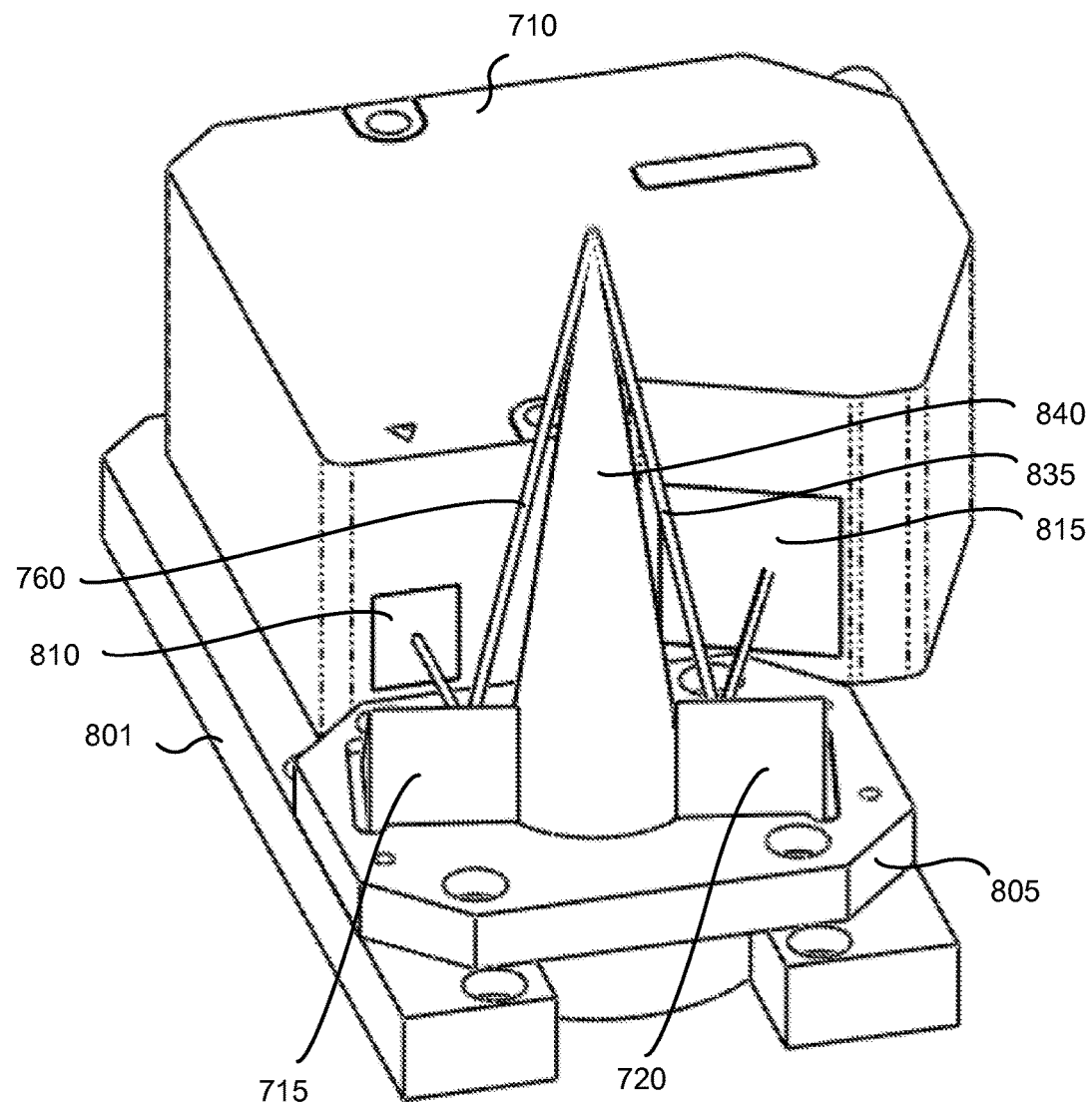
Figure 8C:
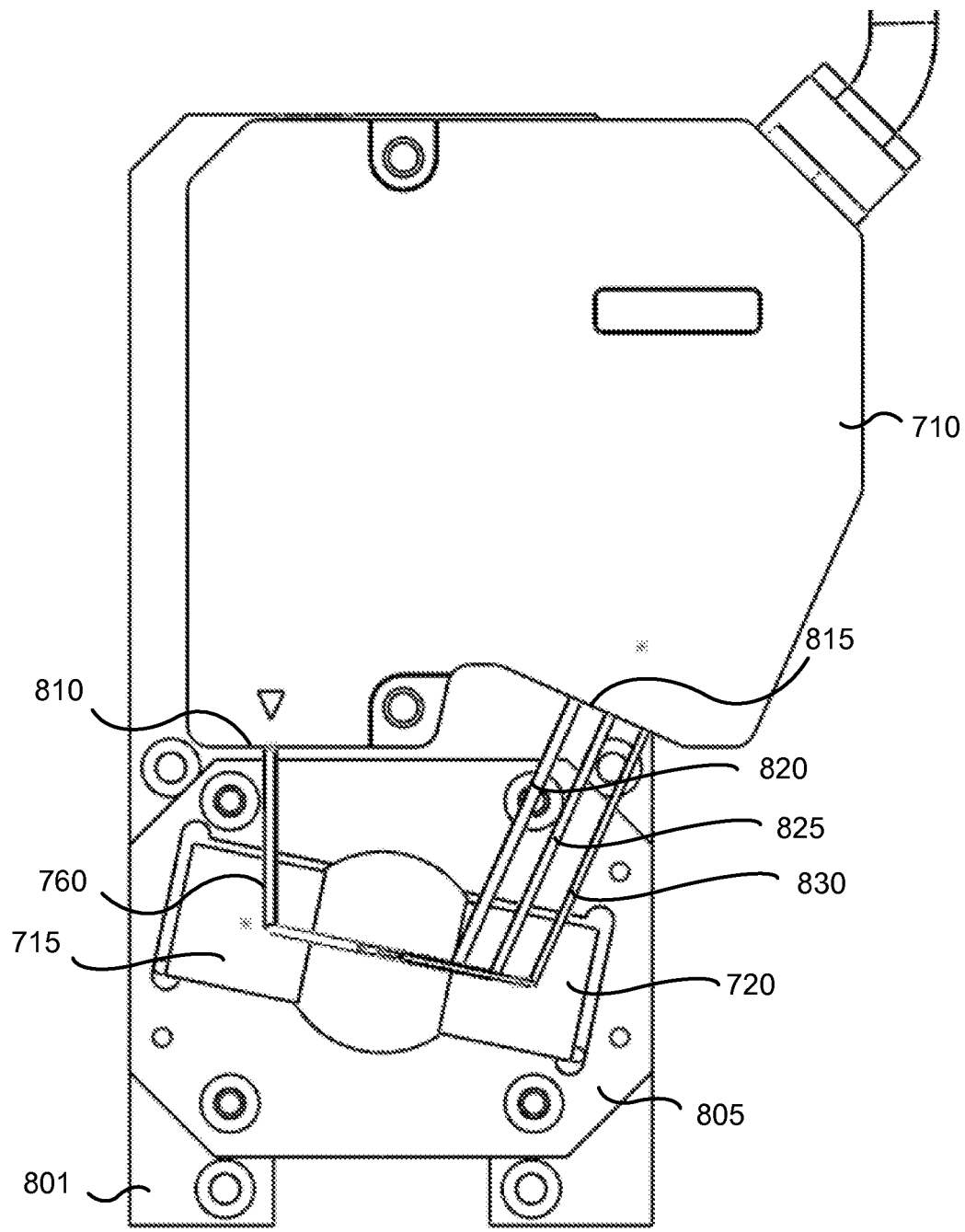
Figure 8D:
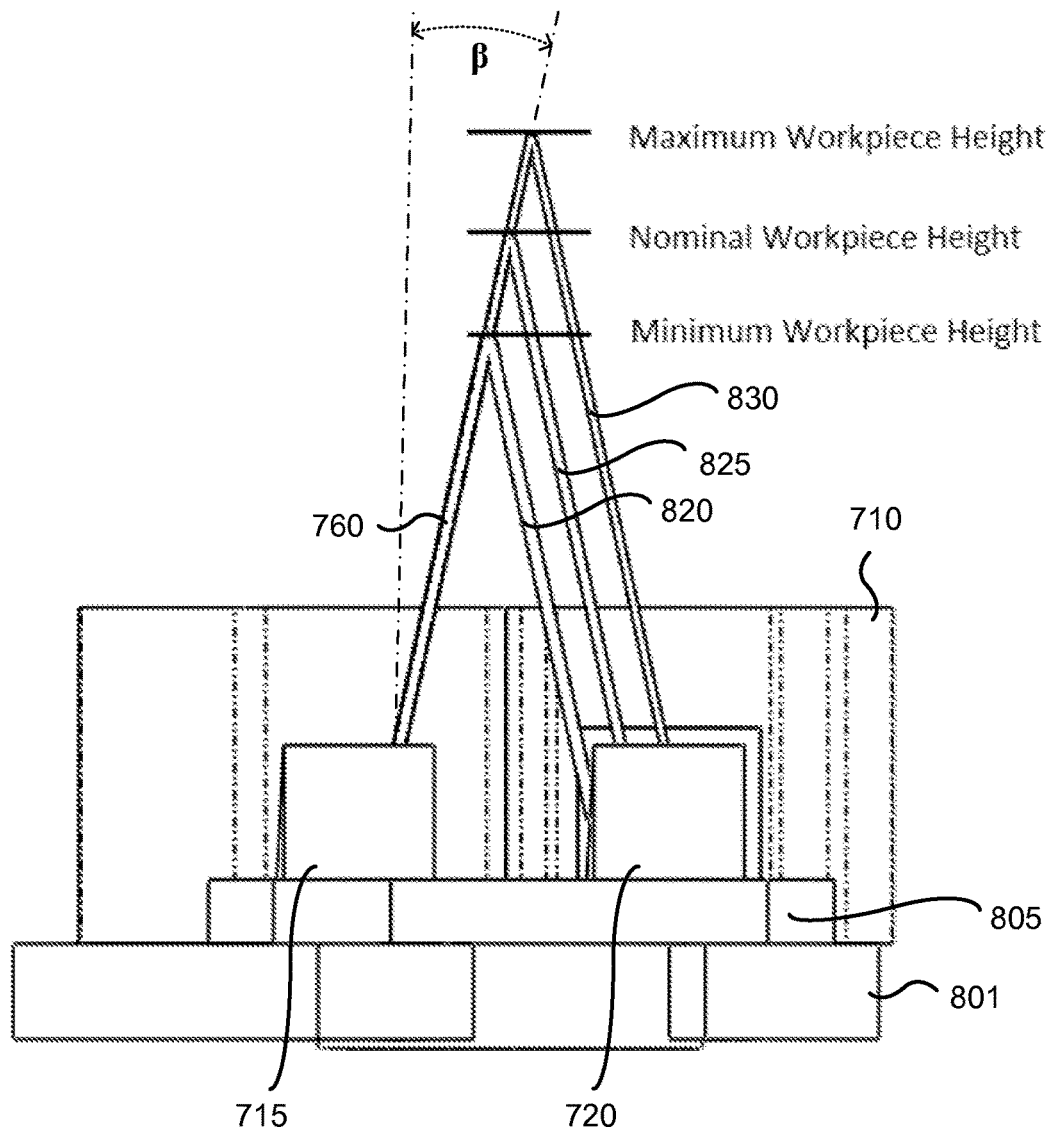

FIGS. 8A-8D show schematic diagrams of a triangulation-based distance sensor and associated reflecting elements. FIGS. 8A and 8B show two isometric projections from different viewpoints. FIG. 8C shows a schematic diagram of a top-down view, similar to FIG. 7C. FIG. 8D shows a front view, similar to FIG. 7B. As shown in FIGS. 8A-8D, a triangulation-based distance sensor, 710, is mounted to a stage, 801. Two reflecting elements, 715 and 720, are also mounted to stage 801, on a mounting bracket, 805. In some embodiments, reflecting elements 715 and 720 are mirrors.

To determine a distance between triangulation-based distance sensor 710 and a substrate, an incident beam, 760, issues from a laser port, 810. Incident beam 760 is reflected from reflecting element 715 about 90 degrees (see e.g. angle α, FIG. 8A) and onto the substrate (not shown; the reflecting surface of the substrate would be at the intersection (apex) of 760 with reflected beams 820, 825 and 830). As shown in FIGS. 8A, 8C, and 8D, when incident beam 760 is reflected from the substrate, this creates a reflected beam, 820, 825, or 830, depending on the position (i.e., the vertical position, in this example) of the substrate. Reflected beam 820 is the reflected beam when the substrate is a minimum vertical distance from, e.g., the top surface of sensor 710 or stage 801. That is, beam 820 is the shortest length beam of the three beams 820, 825 and 830, between the substrate and the detector of sensor 710. Reflected beam 825 is the reflected beam when the substrate is a nominal vertical distance from stage 801 for sensor 710 to detect. Reflected beam 830 is the reflected beam when the substrate is a maximum (readable) distance from stage 801 for sensor 710 to detect. One of reflected beams 820, 825, or 830, or a reflected beam for substrate distances between the minimum distance and the nominal distance, or a reflected beam for substrate distances between the maximum distance and the nominal distance, will be present when a substrate is between the minimum and maximum distances and triangulation-based distance sensor 710 is operating. The reflected beam passes through a detector port, 815, to a detector. The position of the reflected beam on the detector provides an indication of the path length, which corresponds to the distance D in FIG. 1. Thus, the sensor's projected beam, works as it normally would, but the beam path is given an alternative path than that depicted in FIG. 7D (i.e., the conventional path for a triangulation sensor).

FIG. 8B shows only one reflected beam, 835. FIG. 8B also shows a focusing cone, 840, of a scribe laser that is present when the triangulation-based distance sensor and associated reflecting elements are implemented in a scribing apparatus. As shown in FIG. 8B, incident beam 760 reflected from reflecting element 715 and reflected beam 835 reflected from a substrate are reflected around focusing cone 840 of a scribe laser. Bracket 805 and stage 801 have appropriate apertures for allowing passage of the focal cone therethrough and focusing on the substrate (not shown). The beam path of the triangulation sensor is folded to accommodate the laser scribe cone, or whatever beam shape the laser scribe takes. In this example, the incident beam is reflected in such a way as to straddle the focal cone, while intersecting with the scribe beam at the focal point. In one embodiment, reflecting elements 715 and 720 are angled and/or positioned such that the incident beam of the triangulation sensor deviates (e.g. see angle β, FIG. 8D) between about 5 degrees and about 45 degrees from a line normal to the substrate work surface, in another embodiment between about 8 degrees and about 20 degrees from a line normal to the substrate work surface, in another embodiment between about 8 degrees and about 16 degrees, e.g., about 12 degrees. The angle and position of reflecting elements 715 and 720 may vary when using different types of triangulation-based distance sensors. The positioning of reflecting elements 715 and 720 is necessary to direct incident beam 760 to the focal point of the laser scribe, in this example, while accommodating (not sharing the same space as) focusing cone 840 except proximate the focal point (note particularly FIG. 8C).

Embodiments herein are described in terms of the incident beam from the triangulation sensor emanating from the sensor's source (prior to reflection by a reflection element) substantially parallel to the substrate, or orthogonal to the laser scribe beam. Thus the incident beam is reflected about 90 degrees (and tilted toward a focal point as described in the previous paragraph) in order to impinge upon the substrate. This is a non-limiting example. For instance, the incident beam could emanate from the sensor's source at an angle of greater than 90 degrees or less than 90 degrees. In one embodiment, the incident beam emanates from the triangulation-based distance sensor at between about 1 degree and about 20 degrees out of the plane of the substrate, in another embodiment between about 1 degree and about 10 degrees, in yet another embodiment, between about 1 degree and about 5 degrees. Put another way, the angle defined by a line perpendicular to the substrate and the incident beam emanating from the sensor's source, prior to reflection by a reflection element, is between about 70 degrees and about 110 degrees, in another embodiment between about 80 degrees and about 100 degrees, in another embodiment between about 85 degrees and about 95 degrees. One of ordinary skill in the art would appreciate that the reflection elements would have to be configured appropriately in order to establish these angles. Such angles may be appropriate with particular configurations of the sensor's source and/or detector. As described in more detail herein, by folding a triangulation sensor's beam, various configurational constraints related to scribe beam and sensor are overcome.

Figure 9A:
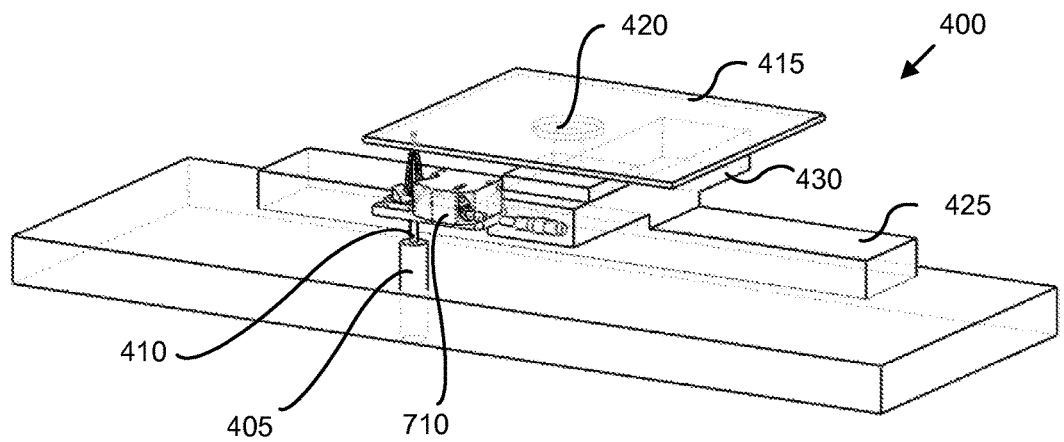
FIGS. 9A and 9B show schematic diagrams of scribing apparatus 400 as shown in FIG. 4 with the triangulation-based distance sensor and associated reflecting elements as shown in FIGS. 8A-8D.
Figure 9B:
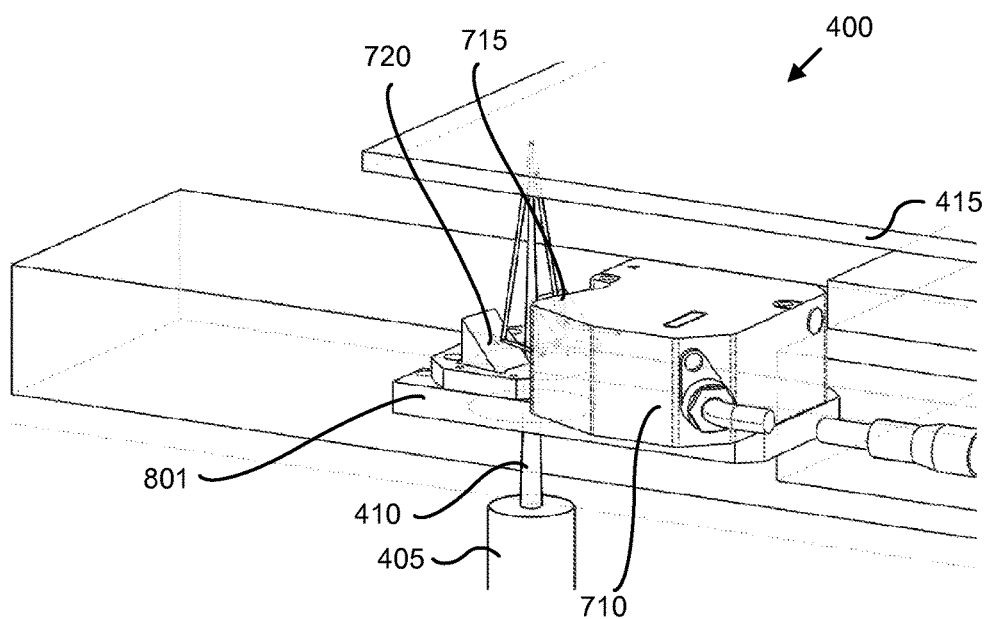

FIGS. 9A and 9B show schematic diagrams of scribing apparatus 400 as shown in FIG. 4 with the triangulation-based distance sensor and associated reflecting elements as shown in FIGS. 8A-8D. FIG. 9B shows a close-up view of the triangulation-based distance sensor and associated reflecting elements. In FIGS. 9A and 9B, a substrate is depicted to show the relative orientation of the sensor, substrate, and laser scribe; the laser scribe beam and the triangulation sensor are on the same side of the substrate during operation. Scribing apparatus 400 includes a scribe laser, 405, that emits a scribe beam, 410, for scribing a substrate, 415. Substrate 415 is held by a gripping mechanism, 420, of scribing apparatus 400. An X-stage, 425, and a Y-stage, 430, are configured to translate substrate 415 so that scribe lines may be formed on substrate 415 or a device disposed on substrate 415. A triangulation-based distance sensor, 710, is mounted to a stage, 801. Stage 801 is mounted to scribing apparatus 400. Triangulation-based distance sensor 710 is positioned offset from scribe beam 410. Also included in this apparatus are optics (not shown), a beam focus adjustment mechanism (not shown), and a processor or logic (not shown). These components are configured to use the position of substrate 415, as determined by triangulation-based distance sensor 710, to adjust the focal point of scribe beam 410 to be at a desired position. For example, the processor may be fed position information, and based on the position of substrate 415, instruct the beam focus adjustment mechanism to adjust the optics to adjust the focal point.

In some embodiments, the scribe beam 405 defines a scribe optical path that is substantially perpendicular to substrate 415. Triangulation-based distance sensor 710 may be oriented such that an incident beam emitted from a triangulation laser is substantially perpendicular to the scribe optical path, is reflected from substrate 415, and is detected by a detector of triangulation sensor 710 positioned such the incident beam and the reflected incident beam entering its detector component are substantially perpendicular to the scribe optical path. In some embodiments, sensor 710 has associated with it a first reflecting element 715 oriented to reflect the incident beam from the triangulation laser that is substantially perpendicular to the scribe optical path to be angled towards (as described herein, e.g., about 12 degrees) the scribe optical path such that the incident beam intersects the scribe beam at a nominal focal plane. It is this angle towards the scribe optical path that allows the incident beam and the reflected beam to form a triangle that straddles the scribe optical path and provides a distance measurement (D) that is nominally coaxial to the scribe optical path. That is, the sensor beam used to make the measurement is not coaxial, but the sensor determines the coaxial path length nonetheless. In some embodiments, triangulation-based distance sensor 710 has associated with it a second reflecting element 720 oriented to reflect the incident beam reflected from the electrochromic lite into the detector of triangulation-based distance sensor 710.

While the scribe optical path and the sensor optical path are not collinear/coaxial, the angle of the sensor optical path (tilt from axis orthogonal to substrate surface) allows the scribe optical path and the sensor optical path to intersect at a point in space. The two paths intersect at, and thus the nominal distance measurement of the triangulation-based distance sensor occurs at, a point along the axis of the scribe optical path at or very near the point at which the scribe beam intersects the target. Thus, for the purposes of this disclosure, "coaxial measurement" means a measurement of the distance along the axis formed by the scribe optical path). As a substrate moves away from the nominal height, a linear X-Y shift in the position of the measurement is introduced, so it is important to note that the coaxial nature of the measurement only holds for a reasonable range of surface distance measurement, for example ±5 millimeters. Thus, the incident beam of the triangulation sensor and the scribe beam are not coaxial in a conventional sense, rather they intersect proximate the focal point of the scribe beam, but the triangulation sensor accurately measures the coaxial distance (D, as described in relation to FIG. 1).

The positioning of triangulation-based distance sensor 710 with respect to scribe beam 745 is determined by the operational parameters of the triangulation-based distance sensor and the space available between the scribe laser source and substrate 730. Triangulation-based distance sensors from different manufacturers have a specified nominal working distance and measurement range (for example, the working distance may be about 80 millimeters, with a range of about ±14 millimeters). A triangulation-based distance sensor also has a specified range on incidence angles. For example, the incident beam may have an angle of incidence with the substrate of a certain value (e.g., about 12 degrees), with and a variation of about ±3 degrees, for example, around that value. In some embodiments, the working distance ranges are about 10 millimeters to 300 millimeters, or about 50 millimeters to 150 millimeters.

Figure 10:
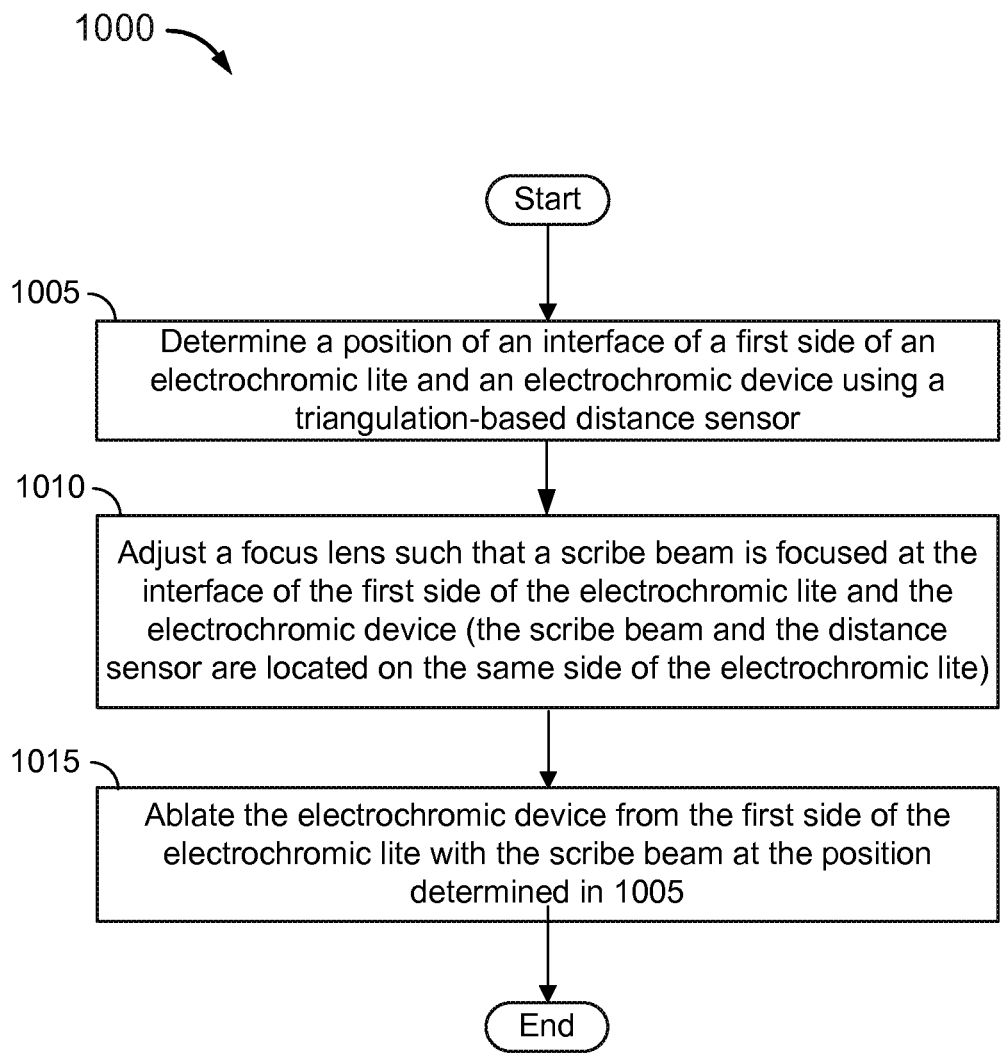
FIG. 10 shows a flowchart depicting a method of scribing an electrochromic lite.

FIG. 10 shows a flowchart depicting a real-time method of scribing an electrochromic lite under the control of triangulation-based detection system as described above. The electrochromic lite has a first side and a second side with an electrochromic device disposed on the first side of the electrochromic lite. The method 1000 shown in FIG. 10 may be implemented with the apparatus and devices shown in FIG. 6, FIGS. 7A-7C, FIGS. 8A-8D, and FIGS. 9A and 9B.

At block 1005, a position of an interface of the first side of the electrochromic lite and the electrochromic device is determined using a triangulation-based distance sensor. The triangulation-based distance sensor may be oriented such that a first laser beam from a triangulation laser is substantially parallel to the first side of the electrochromic lite, is reflected from the electrochromic lite, and is detected by a detector. In some embodiments, the triangulation-based distance sensor further includes a first mirror oriented to reflect the first laser beam from the triangulation laser substantially parallel to the first side of the electrochromic lite to substantially accommodate a scribe optical path defined by a scribe beam while sharing a focal point of the scribe beam. The triangulation-based distance sensor may further include a second mirror oriented to reflect the first laser beam reflected from the electrochromic lite into the detector. In some embodiments, the detector is a charge-coupled device.

At block 1010, a focus lens is adjusted such that a scribe beam emitted from a scribe laser impinges the second side of the electrochromic lite and is focused at the interface of the first side of the electrochromic lite and the electrochromic device, as determined by the triangulation-based distance sensor. For example, a feedback loop may be implemented such that the focus lens adjusts rapidly based on the determination by the triangulation-based distance sensor. In some embodiments, a signal from the triangulation-based distance sensor may be an analog signal which may aid in enabling the rapid adjustment of the focus lens. In some embodiments, the first laser beam and the scribe beam have different wavelengths so that the scribe beam does not interfere with the triangulation-based distance sensor.

At block 1015, the electrochromic device is ablated from a region of the first side of the electrochromic lite with the scribe beam. In some embodiments, the scribe beam has a power of greater than about 500 mW. The focus lens focuses the scribe beam to a small focal point, which concentrates the scribe beam power to a small area and ablates the electrochromic device.

The electrochromic lite may be moved rapidly with respect to the triangulation-based distance sensor. For example, the electrochromic lite may be translated substantially linearly with respect to the triangulation-based distance sensor at about 1 meter per second. The focus lens may be continuously adjusted as the electrochromic lite is translated.

While the disclosed embodiments relate generally to apparatus and methods for tracking the position of a substrate surface being scribed by a scribe beam, the triangulation-based distance sensor and associated optics can be used in other applications. For example, a triangulation-based distance sensor and associated optics may be used in applications including laser patterning, machine vision, measuring focal distance for optical inspection of opaque or transparent substrates, managing working height during precision dispensing of adhesives or conductive inks on large substrates, measuring a distance to a work piece for any process application where the distance to the work piece must be measured at or very near the point of processing from the same side that the process is to be performed, and other similar applications.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. An apparatus configured for scribing an optical coating on a transparent substrate having a first side and a second side with the optical coating disposed on one of the first side and the second side, the apparatus comprising:
    a stage having one side and an opposing side, and an aperture through the stage;
    a scribe laser having a focus lens, a scribe laser beam from the scribe laser, wherein the scribe laser is located on one side of the stage and the transparent substrate is located to the opposing side of the stage, wherein the scribe laser beam is configured to pass through the aperture in the stage to impinge upon the transparent substrate substantially orthogonally, and wherein the scribe laser beam is further configured to ablate the optical coating;

a first mirror attached to the opposing side of the stage;

a second mirror attached to the opposing side of the stage; and a triangulation-based distance sensor attached to the opposing side of the stage and comprising a triangulation laser and a detector, the triangulation-based distance sensor configured such that a triangulation laser beam from the triangulation laser is emitted substantially parallel to the transparent substrate, impinges on and is reflected from the first mirror to impinge on the transparent substrate at a first acute angle of incidence measured with respect to a normal to the transparent substrate, is reflected from the transparent substrate at a second acute angle measured with respect to the normal to the transparent substrate to the second mirror, and is reflected from the second mirror to the detector, wherein the apparatus determines a distance between the one of a first side and a second side of the transparent substrate with the optical coating and the focus lens of the scribe laser based on a measured position of the reflected triangulation laser beam on the detector, and wherein a span of the first acute angle and the second acute angle is a third acute angle which is bisected by the scribe laser beam passing through the aperture in the stage.

2. The apparatus of claim 1, wherein the triangulation-based distance sensor and the scribe laser are located on a same side of the transparent substrate with the optical coating.

3. The apparatus of claim 1, wherein the triangulation laser beam is reflected to the detector in a direction substantially parallel to the transparent substrate.

4. The apparatus of claim 1, wherein the scribe laser has an output power of greater than 500 mW for the scribe laser beam.

5. The apparatus of claim 1, wherein the scribe laser beam and the triangulation laser beam have different wavelengths.

6. The apparatus of claim 1, wherein the triangulation laser beam is configured to intersect the scribe laser beam at a nominal focal plane.

7. The apparatus of claim 1, wherein the triangulation-based distance sensor is configured to determine a position of an interface between the optical coating and the transparent substrate.

8. The apparatus of claim 1, wherein the focus lens is configured to adjust a focal point of the scribe laser beam to an interface between the optical coating and the transparent substrate.

9. The apparatus of claim 7,
further comprising a processor, wherein the processor is configured to position the focus lens to adjust a focal point of the scribe laser beam to the interface determined by the triangulation-based distance sensor.

10. The apparatus of claim 1, wherein the detector is a charge-coupled device.

11. The apparatus of claim 1, wherein the third acute angle formed between incidence and reflection of the triangulation laser beam at the transparent substrate is between about 5 degrees and about 45 degrees.

12. The apparatus of claim 1, wherein the third acute angle formed between incidence and reflection of the triangulation laser beam at the transparent substrate is between about 8 degrees and about 20 degrees.

13. The apparatus of claim 1, wherein the normal to the transparent substrate is coaxial to an optical path of the scribe laser beam.

14. The apparatus of claim 1,
wherein the triangulation-based distance sensor is configured to measure a distance between the triangulation-based distance sensor and the optical coating of the transparent substrate,
and wherein the distance is measured along an axis that is a coaxial to an optical path of the scribe laser beam.

15. The apparatus of claim 14,
wherein the distance is measured to a point at the optical coating,
and wherein the point is located within plus or minus 5 millimeters from an intersection of the scribe laser beam with the optical coating.

16. The apparatus of claim 1, wherein the scribe laser beam is configured to impinge upon the optical coating from the second side of the transparent substrate.

17. The apparatus of claim 1, wherein the scribe laser beam is configured to impinge upon the optical coating from the first side of the transparent substrate.

18. The apparatus of claim 1, wherein the scribe laser is configured to provide the scribe laser beam with a depth of focus of ±100 μm or less.

19. The apparatus of claim 1, wherein the scribe laser is configured to provide the scribe laser beam with a depth of focus of ±50 μm or less.

20. The apparatus of claim 1, wherein the triangulation-based distance sensor and the scribe laser are located, during operation, on an opposite side of the transparent substrate from the optical coating.

* * * * *